(12) United States Patent
Atias et al.

(10) Patent No.: US 10,922,271 B2
(45) Date of Patent: Feb. 16, 2021

(54) METHODS AND SYSTEMS FOR CLUSTERING FILES

(71) Applicant: MinerEye Ltd., Hod Hasharon (IL)

(72) Inventors: Avner Atias, Kfar Yona (IL); Yaniv Avidan, Moshav Mahseya (IL)

(73) Assignee: MINEREYE LTD., Hod Hasharon (IL)

( * ) Notice: Subject to any disclaimer, the term of this patent is extended or adjusted under 35 U.S.C. 154(b) by 184 days.

(21) Appl. No.: 16/154,630

(22) Filed: Oct. 8, 2018

(65) Prior Publication Data

US 2020/0110816 A1 Apr. 9, 2020

(51) Int. Cl.
*G06F 16/00* (2019.01)
*G06F 16/13* (2019.01)
(Continued)

(52) U.S. Cl.
CPC ........... *G06F 16/13* (2019.01); *G06K 9/6218* (2013.01); *G06F 16/168* (2019.01)

(58) Field of Classification Search
CPC ...... G06F 16/355; G06F 16/56; G06F 16/583; G06F 16/5838; G06F 16/61; G06F 16/71; G06F 16/9027; G06F 16/951; G06F 16/13; G06F 16/168; G06F 16/90335; G06F 16/904; G06F 2111/10; G06F 30/20; G06K 2009/3291; G06K 2009/4666; G06K 9/00228; G06K 9/00302; G06K 9/00315;
(Continued)

(56) References Cited

U.S. PATENT DOCUMENTS 7,251,637 B1 * 7/2007 Caid .................... G06K 9/4623
706/15
7,814,078 B1 10/2010 Forman
(Continued)

FOREIGN PATENT DOCUMENTS

WO 2011/070832 6/2011

*Primary Examiner* — Shyue Jiunn Hwa
(74) *Attorney, Agent, or Firm* — Browdy and Neimark, PLLC

(57) ABSTRACT

A method of clustering files, comprises, by a processing unit:
obtaining a clustering structure comprising a plurality of nodes arranged in hierarchical levels $L_i$, with i from 1 to N,
obtaining at least one data ($D_{signal}$) representative of a file ($D_{file}$) to be assigned to a category;
($O_1$) comparing said data to each centroid of each node of the first level,
($O_2$) if said comparison matches an acceptance threshold of one or more nodes, selecting a node among these nodes,
($O_3$) comparing $D_{signal}$ to each centroid of each node of a next level which is linked to said selected node,
($O_4$) if said comparison matches an acceptance threshold of one or more nodes, selecting a node among these nodes,
repeating $O_3$ and $O_4$ until a stopping condition is met, thereby indicating that $D_{signal}$ or $D_{raw}$ belongs to a category of files represented by said selected node.

19 Claims, 18 Drawing Sheets

(51) Int. Cl.
*G06K 9/62* (2006.01)
*G06F 16/16* (2019.01)

(58) Field of Classification Search
CPC ............. G06K 9/00771; G06K 9/6218; G06K 9/6219; G06K 9/6255; G06N 3/0454; G06N 3/088; G06Q 10/10; G06Q 30/02; G06Q 30/0201; G06Q 30/0279; G06T 7/277; G01S 2205/008; G01S 5/0018; G01S 5/0252; G01S 5/0257; G01S 5/06; H04W 64/00; H04L 41/04
See application file for complete search history.

(56) References Cited

U.S. PATENT DOCUMENTS

| | | |
|---|---|---|
| 8,270,733 B2 | 9/2012 | Cobb et al. |
| 2006/0080311 A1* | 4/2006 | Potok .................... G06F 16/355 |
| 2008/0205775 A1* | 8/2008 | Brinker ................. G06F 16/353 |
| | | 382/225 |
| 2008/0294651 A1* | 11/2008 | Masuyama .......... G06K 9/6219 |
| 2009/0037440 A1* | 2/2009 | Will ...................... G06K 9/6219 |
| 2014/0079316 A1 | 3/2014 | Vitaladevuni |
| 2016/0012343 A1 | 1/2016 | Flinn |
| 2016/0299920 A1* | 10/2016 | Feng .................. G06F 16/5838 |
| 2017/0235820 A1 | 8/2017 | Conrad |

\* cited by examiner

METHODS AND SYSTEMS FOR CLUSTERING FILES

TECHNICAL FIELD

The presently disclosed subject matter relates to methods and systems for clustering data, such as files.

BACKGROUND

Systems and methods for clustering/classifying data are used in various technical fields. For example, a firm can store huge amounts of files in various servers, and it can be required to classify these files based on their nature or category.

FIG. 1 depicts a method of clustering data widely used in the prior art, which is known as the "K-means" clustering method.

Assume an example in which a data set is classified by this clustering method into three different clusters or categories (cluster 100, schematically represented by squares, cluster 110, schematically represented by circles, and cluster 120, schematically represented by crosses).

This clustering method suffers from several drawbacks.

Firstly, this clustering method is a supervised method, in which an operator has to define a priori the number of clusters. For example, in FIG. 1, the operator had to define that three clusters exist in the data set, in order to allow the clustering method to perform clustering of the data.

Secondly, an operator has to provide "initial conditions", that it to say that he has to perform some initialization of the clustering method. Quality of the clustering strongly depends on these initial conditions.

Thirdly, when new data is to be classified, this clustering method attempts to identify the closest cluster. For example, as shown in FIG. 1A, assume new data 130 has to be clustered. The clustering method has identified that cluster 100 is the closest cluster among the three clusters, and thus "forces" new data 130 to enter this cluster 100.

This approach is not optimal, since, although the closest cluster is identified, this cluster can be in fact very far from the content of the new data (as shown for example in FIG. 1A, in which "triangles" are classified into the "square" cluster).

Fourthly, when new data is associated with a cluster, all the other clusters need to be redefined (this drawback is known as "refactoring" in the art). This approach is therefore time consuming and requires high processing capability.

Lastly, when it is attempted to cluster new data, this new data needs to be compared to all existing clusters (this clustering method is thus a O(N) method, wherein N is the number of clusters). This approach is therefore time consuming and requires high processing capability.

There is now a need to provide new methods and systems for clustering data, and in particular files.

GENERAL DESCRIPTION

In accordance with certain aspects of the presently disclosed subject matter, there is provided a method of clustering files, comprising, by a processing unit:

obtaining a clustering structure comprising a plurality of nodes arranged in hierarchical levels $L_i$, with i from 1 to N, wherein each node is representative of a category of files, wherein said category is representative of files sharing similarities, wherein each node of level $L_i$ is linked to a parent node of level $L_{i-1}$, with i from 2 to N, thereby indicating that each data belonging to a category represented by said node also belongs to a category represented by said parent node, wherein each node is associated with at least one acceptance threshold, wherein each node associated with at least one centroid representative of files belonging to a category represented by said node, obtaining at least one data ($D_{signal}$) representative of a file ($D_{file}$) to be assigned to a category;

($O_f$) comparing said data to each centroid of each node of the first level, ($O_2$) if said comparison matches the acceptance threshold of one or more nodes, selecting a node among these nodes, ($O_3$) comparing $D_{signal}$ to each centroid of each node of a next level which is linked to said selected node, ($O_4$) if said comparison matches the acceptance threshold of one or more nodes, selecting a node among these nodes, repeating $O_3$ and $O_4$ until a stopping condition is met, thereby indicating that said data $D_{signal}$ or said file $D_{ale}$ belongs to a category of files represented by said selected node.

In addition to the above features, the method according to this aspect of the presently disclosed subject matter can optionally comprise one or more features (i) to (v) below, in any technically possible combination or permutation:

i. at least one of operations $O_2$ and $O_4$ further comprises, if said comparison does not meet an acceptance threshold of any nodes, performing at least one of (a), (b), (c) and (d):

a) providing an output that $D_{signal}$ or $D_{file}$ does not belong to any category of the clustering structure, b) providing an output that $D_{signal}$ or $D_{file}$ does not belong to any category of level $L_i$ of the clustering structure, c) providing an output that $D_{signal}$ or $D_{file}$ does not belong to any sub-category of a category represented by said selected node, d) triggering an action representative of a reject of data $D_{signal}$ or $D_{file}$.

ii. at least one of operations $O_2$ and $O_4$ comprises, if said comparison does not meet an acceptance threshold of any node, creating a new node, wherein, for a level $L_i$ with i>1, said new node is linked to said selected node, wherein a centroid of said new node is determined based at least on $D_{signal}$;

iii. said stopping condition is met if said selected node is not a parent node of any node in a next level and/or said stopping condition is met if said comparison meets an acceptance threshold of said selected node, wherein said acceptance threshold is above a predefined confidence value;

iv. the method comprises at least one of providing an access to $D_{signal}$ or $D_{file}$ which is limited depending at least on a category determined for $D_{signal}$ or $D_{file}$, and identifying or tagging $D_{signal}$ or $D_{file}$ based on characteristics of one or more files previously identified as being associated with said selected node;

v. for each selected node at operations $O_2$ and $O_4$, the method comprises updating a centroid of said node from a first value to a second value, based at least on $D_{signal}$ and on said first value but without requiring accessing to data representative of files previously associated with said selected node.

According to another aspect of the presently disclosed subject matter there is provided a method of clustering files, comprising, by a processing unit:

obtaining a plurality of data ($D_{signal,\ 1}, \ldots, D_{signal,\ z}$) representative of a plurality of files ($D_{file,\ 1}, \ldots, D_{file,\ z}$) to be clustered, building a clustering structure comprising a plurality of nodes arranged in hierarchical levels $L_i$, with i from 1 to N, wherein each node is representative of a category of files, wherein said category is representative of files sharing similarities, wherein said building comprises, based on said plurality of data ($D_{signal,\ 1}, \ldots, D_{signal,\ z}$):

obtaining one or mode nodes of level $L_1$, wherein each node is associated with an acceptance threshold and a centroid representative of files belonging to a category represented by said node, performing repetitively, for i=2 to N:

building one or more nodes of level $L_i$, wherein each node of level $L_i$ is linked to a parent node of level $L_{i-1}$, with i from 2 to N, thereby indicating that each file belonging to a category represented by said node also belongs to a category represented by said parent node, wherein each node is associated with at least one acceptance threshold and at least one centroid representative of files belonging to a category represented by said node, wherein, for each node, said acceptance threshold and said centroid are usable for defining which file belongs to category represented by said node, wherein, during said building, at least part of said plurality of data ($D_{signal,\ 1}, \ldots, D_{signal,\ z}$) or of said plurality of files ($D_{file,\ 1}, \ldots, D_{file,\ z}$) is each associated with one or more of the nodes of the clustering structure, thereby reflecting that said node is representative of a category of files and facilitating future identification of a category of a file based on said clustering structure.

In addition to the above features, the method according to this aspect of the presently disclosed subject matter can optionally comprise one or more of features (vi) to (x) below, in any technically possible combination or permutation:

vi. a value of an acceptance threshold of a node is dynamically updated based on data which is associated with said node during building of the clustering structure, thereby allowing said data to influence said acceptance threshold;

vii. after building of the clustering structure, for each node of level $L_i$, or of at least some nodes of level $L_i$, an acceptance threshold of said node is stricter than an acceptance threshold of its parent node of level $L_{i-1}$, for at least some values of i between 2 and N, or for all values of i between 2 and N, viii. said building comprises:

for i=1, comparing each of one or more data ($D_{signal,\ 1}, \ldots, D_{signal,\ z}$) to each centroid of each node in level $L_1$, for i>1, for a parent node of level $L_{i-1}$ with which a subset of data ($D_{signal,\ 1}, \ldots, D_{signal,\ z}$) is associated, comparing each data of said subset to each centroid of each node of level $L_i$ which is linked to said parent node, for said data, if said comparison meets an acceptance threshold of one or more nodes, associating said data with one of said nodes, if said comparison does not meet an acceptance threshold of any node, creating a new node in level $L_i$, wherein, for i>1, said new node is linked to said parent node of level $L_{i-1}$;

ix. after building nodes of level $L_1$, wherein after said building each node is associated with a centroid having a first value and reflecting data associated with said node, the method comprises performing at least once a verification comprising:

attempting to associate each data of said plurality of data ($D_{signal,\ 1}, \ldots, D_{signal,\ z}$) with a node of level $L_1$, by determining whether a comparison of said data with a centroid of said matches an acceptance threshold of said node, and updating said first value of said centroid of each of one or more nodes based on data associated with said node;

x. after building nodes of level $L_i$ linked with a parent node of level $L_i$ for at least one value of i>1, wherein after said building each node is associated with a centroid having a first value and reflecting data associated with said node, the method comprises performing at least once a verification comprising:

attempting to associate each data associated with said parent node of level $L_i$ with a node of level $L_i$ linked with said parent node, by determining whether a comparison of said data with a centroid of said node matches an acceptance threshold of said node, and updating said first value of said centroid of each of one or more nodes based on data associated with said node.

According to another aspect of the presently disclosed subject matter there is provided a system for clustering files, comprising, by a processing unit:

obtain a clustering structure comprising a plurality of nodes arranged in hierarchical levels $L_i$, with i from 1 to N, wherein each node is representative of a category of files, wherein said category is representative of files sharing similarities, wherein each node of level $L_i$ is linked to a parent node of level $L_{i-1}$, with i from 2 to N, thereby indicating that each data belonging to a category represented by said node also belongs to a category represented by said parent node, wherein each node is associated with at least one acceptance threshold, wherein each node is associated with at least one centroid representative of files belonging to a category represented by said node, obtain at least one data ($D_{signal}$) representative of a file ($D_{file}$) to be assigned to a category;

($O_1$) compare said data to each centroid of each node of the first level, ($O_2$) if said comparison matches the acceptance threshold of one or more nodes, select a node among these nodes, ($O_3$) compare $D_{signal}$ to each centroid of each node of a next level which is linked to said selected node, ($O_4$) if said comparison matches the acceptance threshold of one or more nodes, select a node among these nodes, repeat $O_3$ and $O_4$ until a stopping condition is met, thereby indicating that said data $D_{signal}$ or said file $D_{file}$ belongs to a category of files represented by said selected node.

In addition to the above features, the system according to this aspect of the presently disclosed subject matter can optionally comprise one or more of features (xi) to (xiv) below, in any technically possible combination or permutation:

xi. at least one of operations $O_2$ and $O_4$ further comprises, if said comparison does not meet an acceptance threshold of any nodes, performing at least one of (a), (b), (c) and (d):
   a) providing an output that $D_{signal}$ or $D_{file}$ does not belong to any category of the clustering structure,
   b) providing an output that $D_{signal}$ or $D_{file}$ does not belong to any category of level $L_i$ of the clustering structure,
   c) providing an output that $D_{signal}$ or $D_{file}$ does not belong to any sub-category of a category represented by said selected node,
   d) triggering an action representative of a reject of data $D_{signal}$ or $D_{file}$.
xii. said stopping condition is met if said selected node is not a parent node of any node in a next level and/or said stopping condition is met if said comparison meets an acceptance threshold of said selected node, wherein said acceptance threshold is above a predefined confidence value;
xiii. the system is configured to provide an access to $D_{signal}$ or $D_{file}$ which is limited depending at least on a category determined for $D_{signal}$ or $D_{file}$, and/or the system is configured to identify or tag $D_{signal}$ or $D_{file}$ based on characteristics of one or more files previously identified as being associated with said selected node;
xiv. for each selected node at operations $O_2$ and $O_4$, the system is configured to update a centroid of said node from a first value to a second value based at least on $D_{signal}$ and on said first value but without requiring accessing to data representative of files previously associated with said selected node;

According to another aspect of the presently disclosed subject matter there is provided a system for clustering files, comprising, by a processing unit:
   obtain a plurality of data $(D_{signal, 1}, \ldots, D_{signal, z})$ representative of a plurality of files $(D_{file, 1}, \ldots, D_{file, z})$ to be clustered,
   build a clustering structure comprising a plurality of nodes arranged in hierarchical levels $L_i$, with i from 1 to N, wherein each node is representative of a category of files, wherein said category is representative of files sharing similarities,
   wherein said building comprises, based on said plurality of data $(D_{signal, 1}, \ldots, D_{signal, z})$:
      obtaining one or mode nodes of level $L_1$, wherein each node is associated with an acceptance threshold and a centroid representative of files belonging to a category represented by said node,
      performing repetitively, for i=2 to N:
         building one or more nodes of level $L_i$, wherein each node of level $L_i$ is linked to a parent node of level $L_{i-1}$, with i from 2 to N, thereby indicating that each file belonging to a category represented by said node also belongs to a category represented by said parent node,
         wherein each node is associated with at least one acceptance threshold and at least one centroid representative of files belonging to a category represented by said node,
   wherein, for each node, said acceptance threshold and said centroid are usable for defining which file belongs to the category represented by said node,
   wherein, during said building, at least part of said plurality of data $(D_{signal, 1}, \ldots, D_{signal, z})$, or of said plurality of files $(D_{file, 1}, \ldots, D_{file, z})$ is each associated with one or more of the nodes of the clustering structure, thereby reflecting that said node is representative of a category of files and facilitating future identification of a category of a file based on said clustering structure.

In addition to the above features, the system according to this aspect of the presently disclosed subject matter can optionally comprise one or more of features (xv) to (xviii) below, in any technically possible combination or permutation:

xv. the system is configured to dynamically update a value of an acceptance threshold of a node based on data which is associated with said node during building of the clustering structure, thereby allowing said data to influence said acceptance threshold;
xvi. the system is configured to perform:
   for i=1, comparing each of one or more data $(D_{signal, 1}, \ldots, D_{signal, z})$ to each centroid of each node in level $L_1$,
      for i>1, for a parent node of level $L_{i-1}$ with which a subset of data $(D_{signal, 1}, \ldots, D_{signal, z})$ is associated, comparing each data of said subset to each centroid of each node of level $L_i$ which is linked to said parent node,
   for said data,
      if said comparison meets an acceptance threshold of one or more nodes, associating said data with one of said nodes,
      if said comparison does not meet an acceptance threshold of any node, creating a new node in level $L_i$, wherein, for i>1, said new node is linked to said parent node of level $L_{i-1}$.
xvii. after building nodes of level $L_1$, wherein after said building each node is associated with a centroid having a first value and reflecting data associated with said node, the system is configured to perform at least once a verification comprising:
   attempting to associate each data of said plurality of data $(D_{signal, 1}, \ldots, D_{signal, z})$ with a node of level $L_1$, by determining whether a comparison of said data with a centroid of said matches an acceptance threshold of said node, and
   updating said first value of said centroid of each of one or more nodes based on data associated with said node;
xviii. after building nodes of level $L_i$ linked with a parent node of level $L_i$ for at least one value of i>1, wherein after said building each node is associated with a centroid having a first value and reflecting data associated with said node, the system is configured to perform at least once a verification comprising:
   attempting to associate each data associated with said parent node of level $L_i$ with a node of level $L_i$ linked with said parent node, by determining whether a comparison of said data with a centroid of said node matches an acceptance threshold of said node, and
   updating said first value of said centroid of each of one or more nodes based on data associated with said node.

According to another aspect of the presently disclosed subject matter there is provided a non-transitory storage device readable by a machine, tangibly embodying a program of instructions executable by the machine to perform a method of clustering files comprising:
   obtaining a clustering structure comprising a plurality of nodes arranged in hierarchical levels $L_i$, with i from 1 to N, wherein each node is representative of a category of files,
wherein said category is representative of files sharing similarities,
wherein each node of level $L_i$ is linked to a parent node of level $L_{i-1}$, with i from 2 to N, thereby indicating that each data belonging to a category represented by said node also belongs to a category represented by said parent node,
wherein each node is associated with at least one acceptance threshold, wherein each node associated with at least one centroid representative of files belonging to a category represented by said node,
obtaining at least one data ($D_{signal}$) representative of a file ($D_{file}$) to be assigned to a category;
($O_1$) comparing said data to each centroid of each node of the first level,
($O_2$) if said comparison matches the acceptance threshold of one or more nodes, selecting a node among these nodes,
($O_3$) comparing $D_{signal}$ to each centroid of each node of a next level which is linked to said selected node,
($O_4$) if said comparison matches the acceptance threshold of one or more nodes, selecting a node among these nodes,
repeating $O_3$ and $O_4$ until a stopping condition is met, thereby indicating that said data $D_{signal}$ or said file $D_{file}$ belongs to a category of files represented by said selected node.

In addition to the above features, the non-transitory storage device according to this aspect of the presently disclosed subject matter can optionally perform a method comprising one or more of features (i) to (v) above, in any technically possible combination or permutation.

According to another aspect of the presently disclosed subject matter there is provided a non-transitory storage device readable by a machine, tangibly embodying a program of instructions executable by the machine to perform a method of clustering files comprising:
obtaining a plurality of data ($D_{signal, 1}, \ldots, D_{signal, z}$) representative of a plurality of files ($D_{file, 1}, \ldots, D_{file, z}$) to be clustered,
building a clustering structure comprising a plurality of nodes arranged in hierarchical levels $L_i$, with i from 1 to N, wherein each node is representative of a category of files, wherein said category is representative of files sharing similarities,
wherein said building comprises, based on said plurality of data ($D_{signal, 1}, \ldots, D_{signal, z}$):
obtaining one or mode nodes of level $L_1$, wherein each node is associated with an acceptance threshold and a centroid representative of files belonging to a category represented by said node,
performing repetitively, for i=2 to N:
building one or more nodes of level $L_i$, wherein each node of level $L_i$ is linked to a parent node of level $L_{i-1}$, with i from 2 to N, thereby indicating that each file belonging to a category represented by said node also belongs to a category represented by said parent node, wherein each node is associated with at least one acceptance threshold and at least one centroid representative of files belonging to a category represented by said node,
wherein, for each node, said acceptance threshold and said centroid are usable for defining which file belongs to category represented by said node,
wherein, during said building, at least part of said plurality of data ($D_{signal, 1}, \ldots, D_{signal, z}$) or of said plurality of files ($D_{file, 1}, \ldots, D_{signal, z}$) is each associated with one or more of the nodes of the clustering structure, thereby reflecting that said node is representative of a category of files and facilitating future identification of a category of a file based on said clustering structure.

In addition to the above features, the non-transitory storage device according to this aspect of the presently disclosed subject matter can optionally perform a method comprising one or more of features (vi) to (x) above, in any technically possible combination or permutation.

According to some embodiments, the proposed solution is able to classify huge numbers of files into categories of files sharing similarities.

In particular, according to some embodiments, the proposed solution can identify different versions of a file (e.g. which is updated over time by one or more users) and to classify these versions into a single category.

According to some embodiments, the proposed solution is able to classify huge numbers of files into categories of files sharing similarities, thereby allowing handling access to these files based on profiles of users.

According to some embodiments, the proposed solution reduces time and processing required for classifying data such as files.

According to some embodiments, the proposed solution is unsupervised, and does not require from an operator to define a priori a number of clusters/categories.

According to some embodiments, the proposed solution is unsupervised, and does not require an operator to provide an a priori knowledge on the content of the data.

According to some embodiments, the proposed solution does not strongly depend on initial conditions provided by an operator.

According to some embodiments, when new data is to be clustered, the proposed solution does not require refactoring.

According to some embodiments, the proposed solution is adaptive to new data such as new files, and in particular, is able to create new clusters, and/or to reject new data/new files that do not fit with existing clusters/categories.

According to some embodiments, the proposed solution lets data/files dictate parameters of the clusters/categories, thereby proposing a customized and adaptive clustering.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION

In the following detailed description, numerous specific details are set forth in order to provide a thorough understanding of the invention. However, it will be understood by those skilled in the art that the presently disclosed subject matter may be practiced without these specific details. In other instances, well-known methods have not been described in detail so as not to obscure the presently disclosed subject matter.

Unless specifically stated otherwise, as apparent from the following discussions, it is appreciated that throughout the specification discussions utilizing terms such as "obtaining", "comparing", "selecting", "associating", "creating", "identifying", "tagging" or the like, refer to the action(s) and/or process(es) of a processing unit that manipulates and/or transforms data into other data, said data represented as physical, such as electronic, quantities and/or said data representing the physical objects.

The term "processing unit" covers any computing unit or electronic unit with data processing circuitry that may perform tasks based on instructions stored in a memory, such as a computer, a server, a chip, a processor, a hardware processor, etc. It encompasses a single processor or multiple processors, which may be located in the same geographical zone or may, at least partially, be located in different zones and may be able to communicate together.

The term "memory" as used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

The invention contemplates a computer program being readable by a computer for executing one or more methods of the invention. The invention further contemplates a machine-readable memory tangibly embodying a program of instructions executable by the machine for executing one or more methods of the invention.

Figure 1:
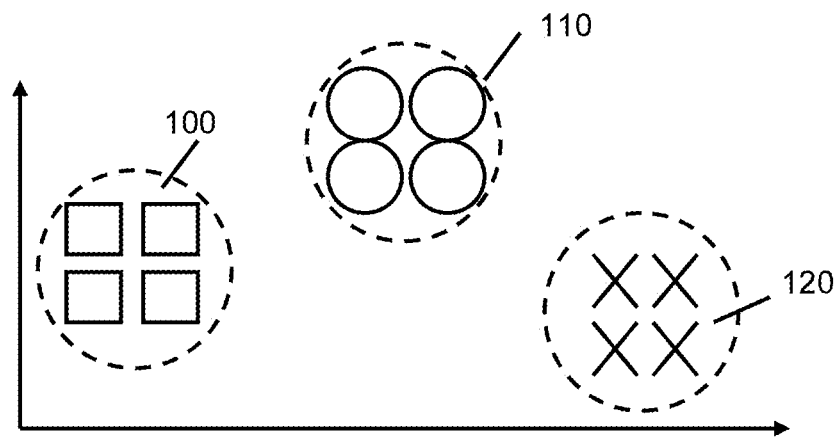
FIGS. 1 and 1A illustrate prior art solutions for clustering data such as files.
Figure 1A:
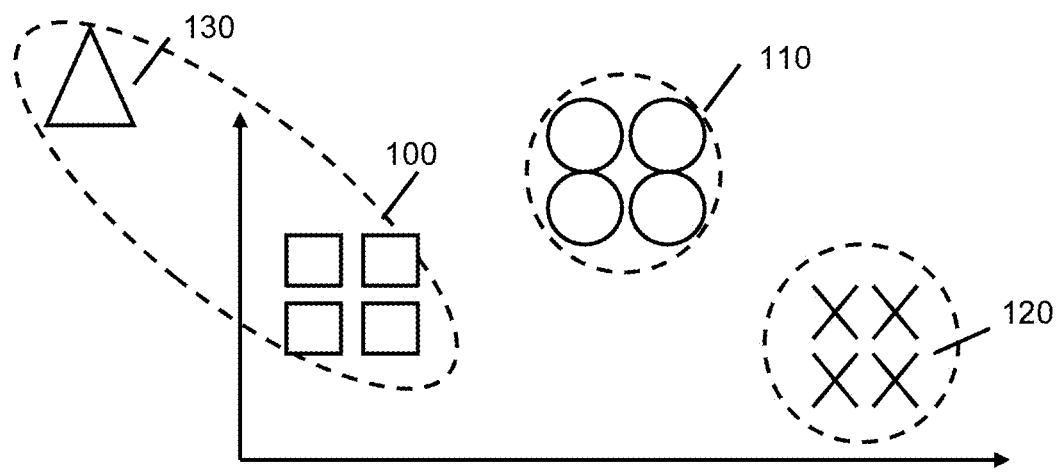
Figure 2:
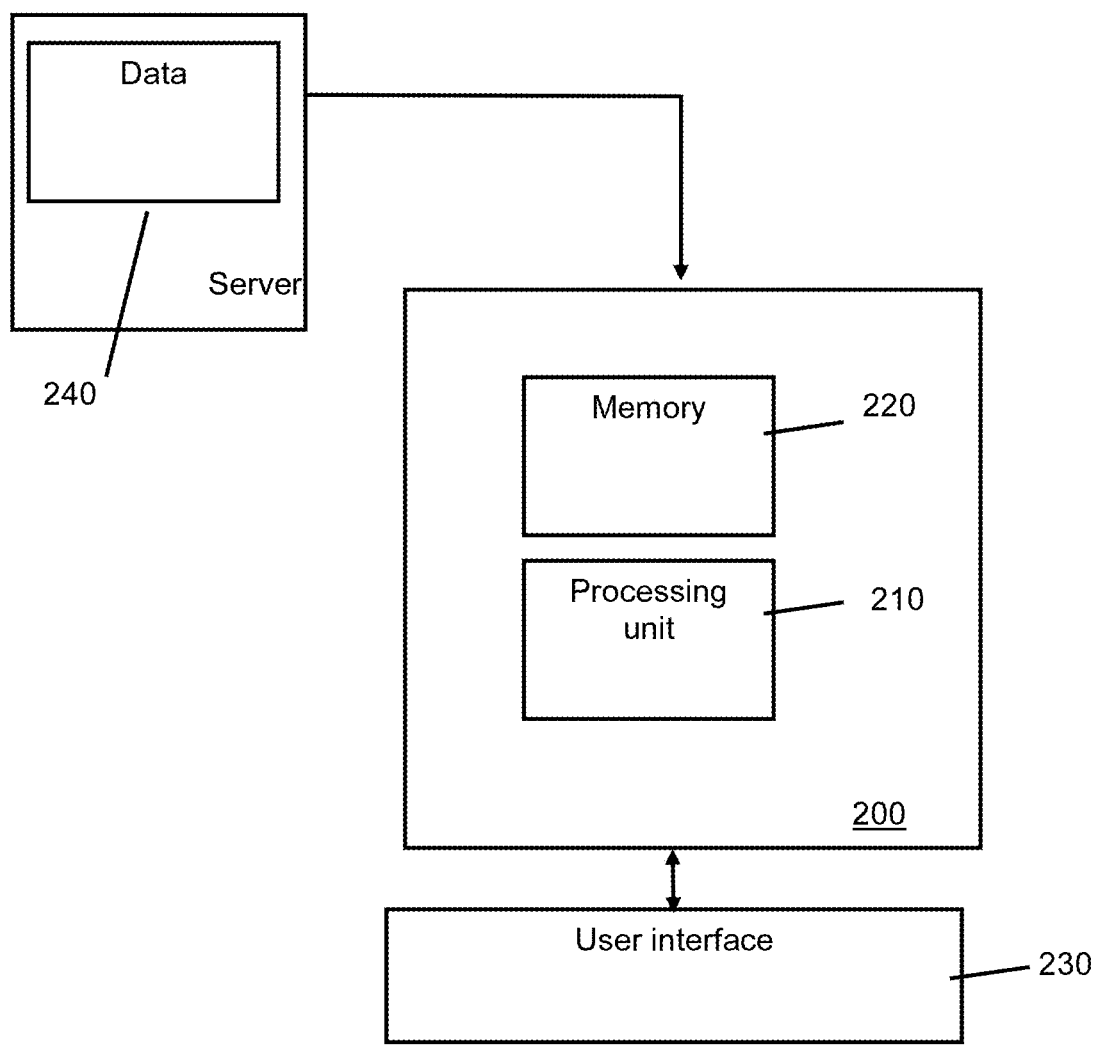
FIG. 2 illustrates an embodiment of a system for clustering files.

FIG. 2 illustrates a system 200 configured to cluster data. As illustrated in FIG. 2, system 200 can receive data to be clustered from various sources. This data can be extracted e.g. from a server, or from a plurality of servers storing this data.

For example, system 200 can have a read-access authorization to a server in order to extract content of the data 240 to be clustered.

The system 200 can comprise at least one processing unit 210 and at least one memory 220. According to some embodiments, the memory 220 is not part of the system 200 but can communicate with system 200 using known wireless/wire communication network.

As explained hereinafter in the specification, memory 220 can store at least:

raw data to be clustered, or at least part of them;

data representative of the raw data to be clustered, or at least part of them (as explained hereinafter in the specification);

a clustering structure for clustering data (as explained hereinafter in the specification).

According to some embodiments, the system 200 can comprise, or can communicate with a user interface 230. User interface 230 can comprise e.g. a display allowing a user to visualize output of the clustering. According to some embodiments, user interface 230 can comprise an interface (graphical interface, or physical interface such as a keyboard) allowing the user to perform requests or and/or provide data to the system 200.

The system 200 (alone or in combination with another processing unit) can be used to perform one or more embodiments of the various methods described hereinafter.

Figure 3:
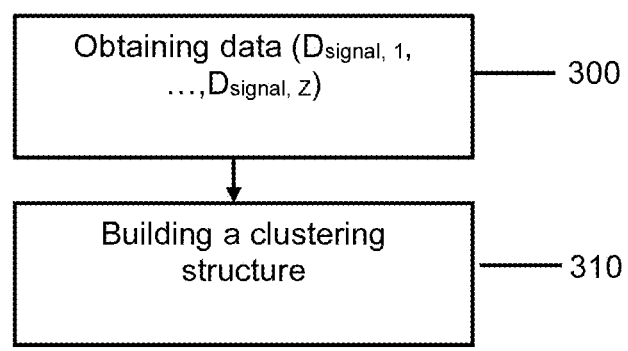
FIG. 3 depicts an embodiment of a method of building a clustering structure.

Attention is now drawn to FIG. 3, which depicts an embodiment of a method of building a clustering structure based on data that is to be clustered. This method can be performed using system 200, and/or with another processing unit.

The method can comprise operation 300, in which a plurality of data ($D_{signal, 1}, \ldots, D_{signal, Z}$, representative of a plurality of piece of data ($D_{raw, 1}, \ldots, D_{raw, Z}$) to be clustered is obtained.

For example, assume a plurality of files ($D_{raw, 1}, \ldots, D_{raw, Z}$) or ($D_{file, 1}, \ldots, D_{file, Z}$) stored in various servers of a firm need to be clustered. Specific examples will be provided hereinafter.

Data ($D_{signal, 1}, \ldots, D_{signal, Z}$) representative of this data ($D_{raw, 1}, \ldots, D_{raw, Z}$) can include e.g. a binary content of these files, a vector and/or matrix representative of this binary content, a mathematical encoding of this binary content, etc.

According to some embodiments, data ($D_{signal, 1}, \ldots, D_{signal, Z}$) can be obtained by performing a conversion of each data ($D_{raw, 1}, \ldots, D_{raw, Z}$) into a corresponding signal using the method described in patent application U.S. Ser. No. 15/360,612.

According to some embodiments, ($D_{signal, 1}, \ldots, D_{signal, Z}$) and ($D_{raw, 1}, \ldots, D_{raw, Z}$) are equal, depending on the type of data to be clustered.

According to some embodiments, each data ($D_{raw, 1}, \ldots, D_{raw, Z}$) can be an image, and each data ($D_{signal, 1}, \ldots, D_{signal, Z}$) can comprise a vector or a matrix representative of pixels of each image.

According to some embodiments, each data ($D_{raw, 1}, \ldots, D_{raw, Z}$) can be results of medical tests, and each data ($D_{signal, 1}, \ldots, D_{signal, Z}$) can comprise a vector or a matrix representative of these results.

These examples are not limitative and various other data can be used.

($D_{signal,\ 1}$, ..., $D_{signal,\ Z}$) can comprise a mathematical representation of ($D_{raw,\ 1}$, ..., $D_{raw,\ Z}$) that can be processed in the clustering method.

The method can further comprise (operation 310), based at least on data ($D_{signal,\ 1}$, ..., $D_{signal,\ Z}$), building a clustering structure comprising a plurality of nodes $N_{j,L_i}$ arranged in hierarchical levels $L_i$ (or hierarchical levels $L_i$), with i from 1 to N. Index "i" represents the value of the level in the clustering structure, and index "j" represents a number of the node in this level $L_i$. Generally when a node belongs to level $L_i$, this indicates that this node can be reached by "going through" i−1 "parent" nodes from level $L_1$.

As explained hereinafter, each node $N_{j,L_i}$ is representative of a group or category of data sharing similarities in their content.

The higher the index "i" of the level, the more the division into categories is fine, and the higher the resolution and differentiation between data/files (in other words, nodes of levels with index "i" of low value represent general categories, whereas nodes of levels with index "i" of higher value represent sub-categories of these general categories).

In addition, once the clustering structure is built according to the various embodiments described hereinafter, the acceptance threshold of a children node is generally stricter than the acceptance threshold of its parent node (stricter means that a higher correspondence with the centroid of the node is required to be associated with the node, and generally this implies that the acceptance threshold has a higher value).

This reflects the fact that the higher the index "i" of the level, the more the division into categories is fine (and therefore the similarities between the files of a same node are higher). This can be obtained in particular using a method in which the acceptance threshold of a node is influenced by data associated with this node (see e.g. an example of such a method in FIG. 9), and/or by setting in advance acceptance thresholds which are more strict for nodes belonging to a level with an higher index that for nodes belonging to a level with a lower index.

A category of files is to be understood as a group of files sharing similarities (in other words, the system detects that the content of $D_{signal}$ representative of each of these files has some similarities, such as similar bytes stored in $D_{signal}$, etc.—methods for detecting these similarities will be provided hereinafter).

A category of files is not necessarily an "explicit" category (that is to say that it is not always possible to give a name to the category which would summarize the common features of these files and would be of interest for the user, such as "invoice", "receipt"), but in any case, when files are associated to a node, the system has identified that these files share similarities in their data $D_{signal}$ representative thereof, and therefore can be classified into a common category. The system can then perform various post-processing actions based on this knowledge, as explained hereinafter.

According to some embodiments, an analysis of these categories can be performed in order to understand the "name" or the "nature" of the category, in particular in the end nodes of the clustering structure, for which the differentiation is the highest. Examples of names of categories of files can include e.g.: files of the same nature (invoice category, receipt category, legal documents category, etc.), different release of the same file (e.g. file X version 1, file X version 1.1, etc. will correspond to a common category "file X"), files sharing common extension (executable files, pdf file, etc.), files storing similar content (files about history, files about geography, files about politics, etc.). These examples are not limitative and various other categories of files can be identified based on the use case.

In the intermediate nodes of the clustering structure, the nodes are also built to comprise files sharing similarities (that is to say category of files), however, these nodes do not necessarily correspond to explicit or useful categories which can be used by a user to classify these files. This is due to the fact that the acceptance threshold in these intermediate nodes is more flexible. In any case, although in the intermediate nodes an explicit name of the category is not necessarily identifiable, the system has identified that these files share similarities and this is useful to build the next nodes up to the end nodes which are more specific.

As explained hereinafter, each node $N_{j,L_i}$ can be (at least temporarily) associated with one or more of data ($D_{signal,\ 1}$, ..., $D_{signal,\ Z}$) to be clustered, thereby indicating that this data belongs to a category represented by this node. In practice, since ($D_{signal,\ 1}$, ..., $D_{signal,\ Z}$) is representative of the true data (e.g. files) ($D_{raw,\ 1}$, ..., $D_{raw,\ Z}$), the system can store that ($D_{signal,\ 1}$, ..., $D_{signal,\ Z}$) is associated to a node and/or that ($D_{raw,\ 1}$, ..., $D_{raw,\ Z}$) is associated to a node. In the following description, it is to be understood that both operations can be performed even if this is not recited explicitly.

The association of the node with the data can be stored temporarily (e.g. during at least some operations performed during the building of the clustering structure) for some nodes, and for other nodes, can be stored even after completion of the building of the clustering structure (e.g. for future use).

Specific examples will be provided hereinafter.

In addition, association of data with nodes can evolve over time, for example because new data are received, and/or because operations are performed to fine tune the definition of the categories represented by the nodes, as explained hereinafter.

Possible operations that can be performed for building a clustering structure will now be described.

Figure 4:
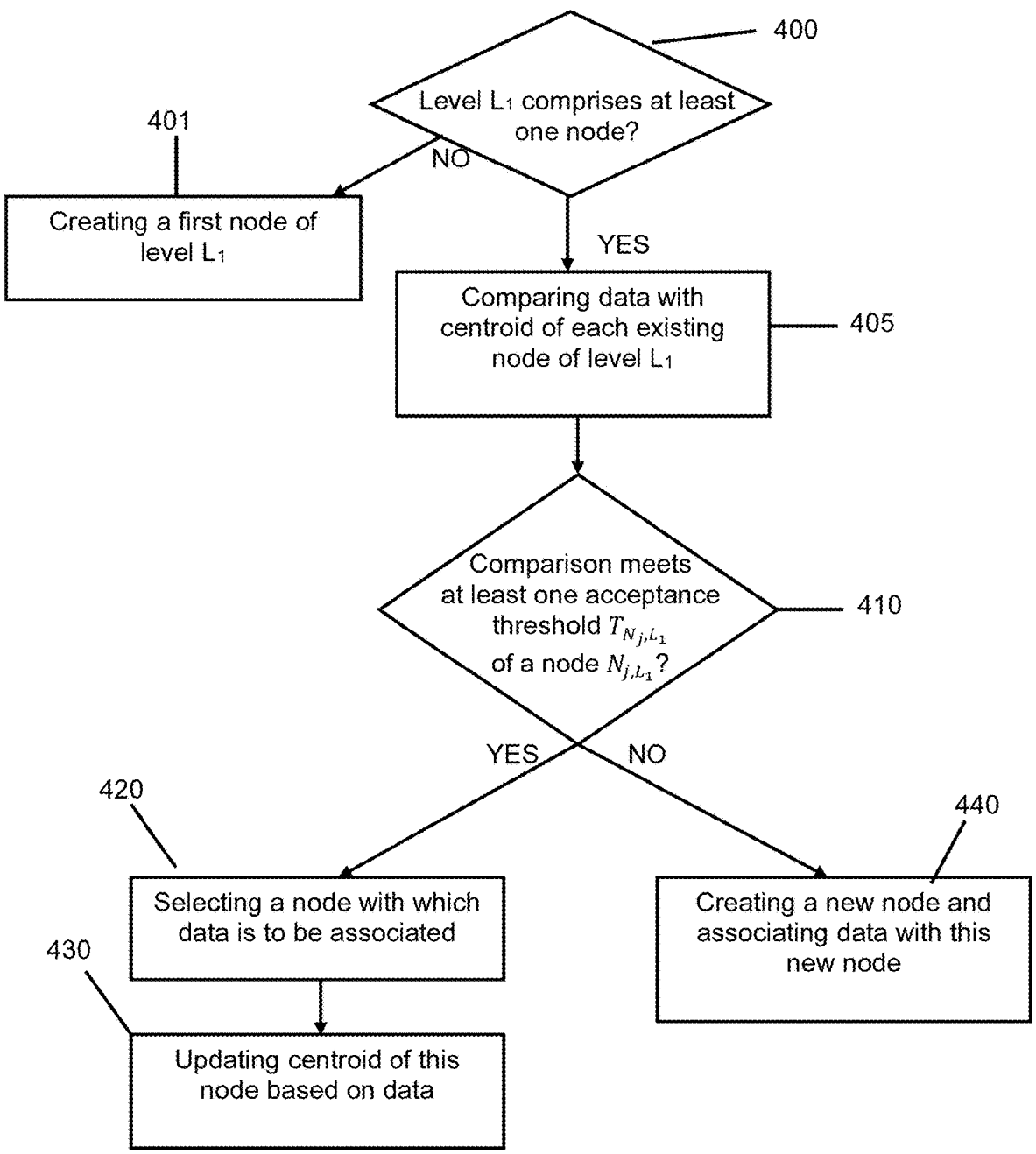
FIG. 4 depicts an embodiment of a method of building a first level $L_1$ of the clustering structure.

FIG. 4 depicts a method of building a first level $L_1$ of the clustering structure, based at least on data ($D_{signal,\ 1}$, ..., $D_{signal,\ Z}$). In some embodiments, data ($D_{signal,\ 1}$, ..., $D_{signal,\ Z}$) can be representative of data ($D_{raw,\ 1}$, ..., $D_{raw,\ Z}$).

Figure 5:
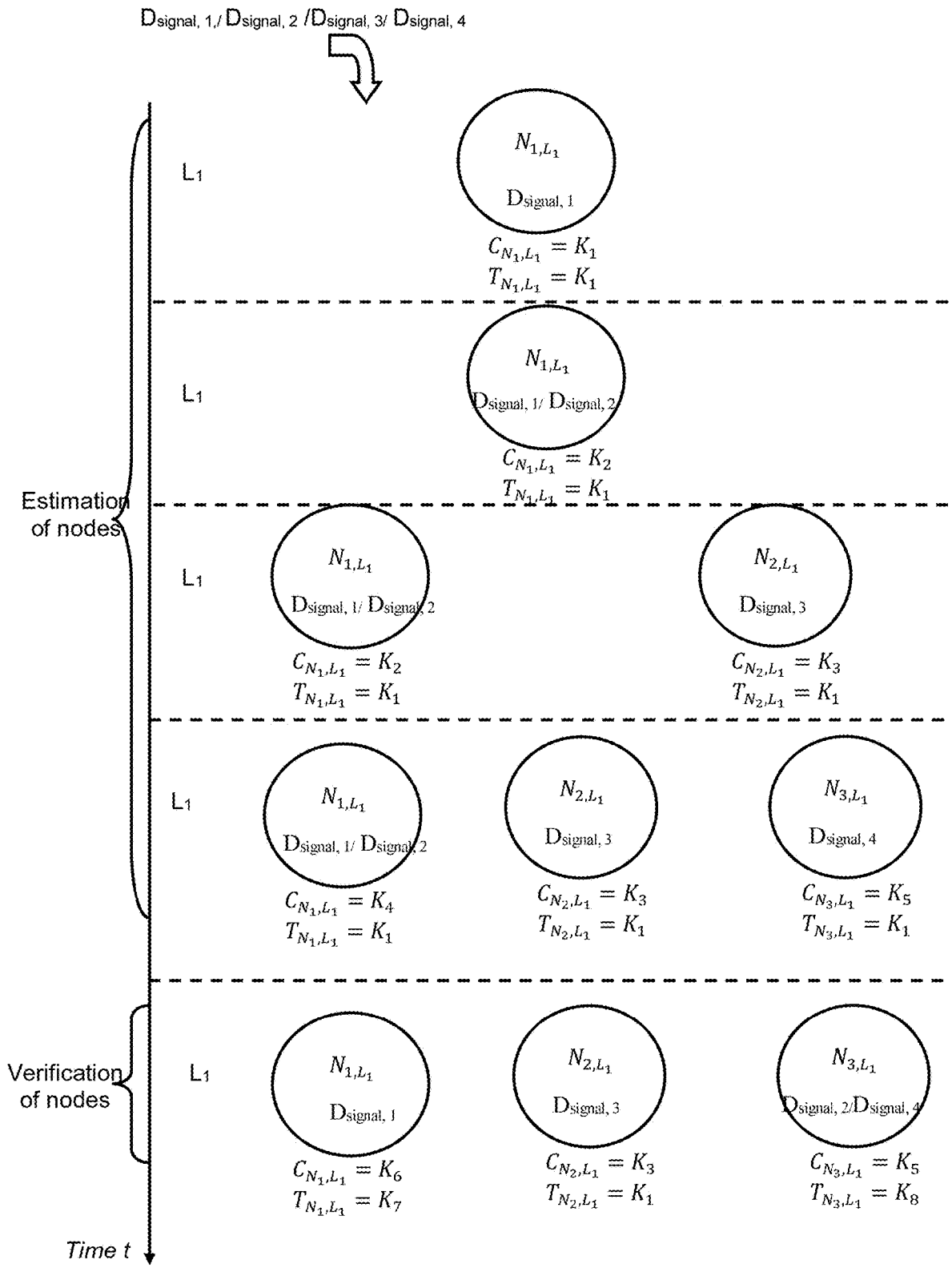
FIG. 5 depicts a non-limitative example illustrating the method of FIG. 4.

FIG. 5 depicts a non-limitative example illustrating the method of FIG. 4, wherein Z=4.

The method can comprise building at least one, or a plurality of nodes $N_{j,L_1}$ of level $L_1$.

Initially, if level $L_1$ does not comprise any node, when first data (for instance, $D_{signal,\ 1}$) is obtained, the method can comprise creating a first node $N_{1,L_1}$ (see operation 400 and 401 in FIG. 4).

As explained hereinafter in the specification, each node $N_{j,L_i}$ can be associated with at least one acceptance threshold $T_{N_j,L_i}$ (this association can be stored e.g. in memory 220 of system 200). This acceptance threshold $T_{N_j,L_i}$ can be used to assess whether data sufficiently corresponds, or does not sufficiently correspond, to a category of data represented by each node $N_{j,L_i}$.

In addition, each node $N_{j,L_i}$ can be associated with at least one centroid $C_{N_j,L_i}$ representative of data belonging to a category represented by this node $N_{j,L_i}$ (this association can be stored e.g. in memory 220 of system 200). Centroid $C_{N_j,L_i}$ can be viewed e.g. as an aggregated representation of data belonging to a category represented by this node $N_{j,L_i}$.

Embodiments of methods of computing centroid $C_{N_j,L_i}$ will be described hereinafter.

In some embodiments, acceptance threshold $T_{N_j,L_i}$ of a node $N_{j,L_i}$ can be pre-set by a user, or predefined in a memory 220 of system 200. In some embodiments, for each level, an acceptance threshold is pre-set or predefined for all nodes of this level.

In some embodiments, acceptance threshold $T_{N_j,L_i}$ of a node $N_{j,L_i}$ can be defined based on data that is associated with the node during building of the clustering structure (or during update of the clustering structure, when new data are received), as explained hereinafter. Therefore, value of the acceptance threshold $T_{N_j,L_i}$ of a node can evolve over time, based on data progressively associated with this node.

In other words, data itself can influence the acceptance threshold of the node to which it belongs.

In particular, in some embodiments, a user does not need to set any threshold for at least some of (or all) the nodes, and the data itself dictates the threshold which is dynamically updated based on data associated with the node.

Concerning the centroid $C_{N_j,L_i}$ of a node $N_{j,L_i}$, according to some embodiments, the centroid of a node can be calculated based on data that is associated to a category represented by this node.

In some embodiments, $C_{N_j,L_i}$ of a node $N_{j,L_i}$ can be determined using a mathematical function allowing an aggregated representation of data associated with a category represented by this node $N_{j,L_i}$.

For example, an average of the data associated with a category represented by a node $N_{j,L_i}$ can be used to determine centroid $C_{N_j,L_i}$. In other words, centroid of a node will correspond, in this non-limitative example, to the average of the data associated with this node.

This is not limitative and other functions can be used to determine the centroid based on data associated with this node, such as: average Mahalanobis distance relative to a center of mass, sample that minimizes the distance to all others (Cross-distance matrix), etc. These examples are not limitative.

In the example of FIG. 5, first node $N_{1,L_1}$ is associated with an acceptance threshold $T_{N_1,L_1}$ and with a centroid $C_{N_1,L_1}$.

Assume a simple example in which the acceptance threshold is predefined for all nodes of level $L_1$. As mentioned above, this is not limitative.

Assume in this example that centroid $C_{N_j,L_i}$ of a node $N_{j,L_i}$ is calculated based on an average of data associated with this node. Therefore, in the present example, $C_{N_1,L_i}$ can be determined based on data $D_{signal,\ 1}$, and can be set equal to this data $D_{signal,\ 1}$, since the average of a single data corresponds to this single data.

The method can comprise obtaining further data (e.g. $D_{signal,\ 2}$ to $D_{signal,\ Z}$) and attempting to cluster this data.

For the first level $L_1$, this can comprise (operation 400) comparing each data ($D_{signal,\ 2}, \ldots, D_{signal,\ Z}$) to each centroid $C_{N_j,L_1}$ of each node $N_{j,L_1}$ of level $L_1$.

If a comparison between this data and a centroid $C_{N_j,L_1}$ of a node $N_{j,L_1}$ of level $L_1$ matches (reference 410) the acceptance threshold $T_{N_j,L_1}$, this indicates that this data can belong to a category represented by this node $N_{j,L_1}$, and that this data can be associated with this node $N_{j,L_1}$.

For a given data, if this comparison matches the acceptance threshold $T_{N_j,L_1}$ of each of a plurality of nodes $N_{j,L_1}$ (and not only of a single node), then the method can comprise selecting (operation 420) a single node among these plurality of nodes.

For example, the selected node can be the node for which the comparison matches the best the acceptance threshold $T_{N_j,L_1}$.

For example, assume the acceptance threshold requires a matching of $T_{N_j,L_1}=0.3$ between the data and the centroid of the node, and that the comparison provided, for given data, a matching of 0.4 for a first node, a matching of 0.5 for a second node, and a matching of 0.8 for a third node. In this example, the third node can be selected as the node with which this given data can be associated, since the matching of this given data with the centroid of this node was the best.

Since the data is now associated with this selected node, the method can comprise updating (operation 430) the centroid of this selected node. This update takes into account the new data that has been associated to this selected node at this stage.

For example, if the centroid is determined based on an average of the data associated to this node, then the updated centroid can be determined by taking into account this data in the computation of the new average.

If another function F is used to determine the centroid based on the data associated with the node, then this function F can be used to take into account this new data for updating the centroid. For example, assume that data $D_{old}$ associated with a node has been used to calculate the centroid, and that new data $D_{new}$ is now associated with this node, then the new centroid can be calculated with a function $F(D_{old}, D_{new})$. In some embodiments, and as described in FIG. 6, it is not necessary to explicitly have access to $D_{old}$.

If the comparison did not meet an acceptance threshold $T_{N_j,L_1}$ of any of nodes $N_{j,L_1}$ of level $L_1$, the method can comprise, according to some embodiments, creating (operation 440) a new node in level $L_1$.

The method can comprise storing in a memory, at least temporarily, an information representative of the fact that this data is now associated with this new node.

The centroid of this new node can be calculated based on this data.

If the centroid of a node is calculated based on an average of data corresponding to this node, then since this new node is at this stage only associated with this new data, the centroid of this new node can be set equal to this new data.

In the example of FIG. 5, after creation of $N_{1,L_i}$ and association of $D_{signal,\ 1}$ to this node, then data $D_{signal,\ 2}$ can be processed.

When data $D_{signal,\ 2}$ is processed, only node $N_{1,L_i}$ has been created.

Assume that a comparison of $D_{signal,\ 2}$ with centroid $C_{N_1,L_1}$ of node $N_{1,L_1}$ met acceptance threshold $T_{N_1,L_1}$. This indicates that, at this stage, $D_{signal,\ 2}$ is considered as belonging to a category represented by node $N_{1,L_1}$.

The method can comprise storing in a memory, at least temporarily, an information indicating that $D_{signal,\ 2}$ is associated with node $N_{1,L_1}$.

As a consequence, centroid $C_{N_1,L_1}$ of node $N_{1,L_1}$ can be updated based on the fact that new data $D_{signal,\ 2}$ is considered as belonging to a category represented by node $N_{1,L_1}$. If centroid of a node is calculated based on an average of data associated to this node, then centroid $C_{N_1,L_1}$ can be updated accordingly, by recalculating this average.

After data $D_{signal,\ 2}$ has been processed, $D_{signal,\ 3}$ can be processed.

Assume that a comparison of $D_{signal,\ 3}$ with centroid $C_{N_1,L_1}$ of node $N_{1,L_1}$ did not meet acceptance threshold $T_{N_1,L_1}$.

The method can comprise creating a new node $N_{2,L_1}$ (as explained in operation 440). Data $D_{signal,\ 3}$ can be associated with this new node $N_{2,L_1}$.

Centroid $C_{N_2,L_1}$ of node $N_{2,L_1}$ can be determined based on the fact that data $D_{signal,\ 3}$ is considered as belonging to a category represented by node $N_{2,L_1}$.

If the centroid of a node is calculated based on an average of data corresponding to this node, then since this new node $N_{2,L_1}$ is at this stage only associated with this new data $D_{signal, 3}$, the centroid of this new node $N_{2,L_1}$ can be set equal to this new data $D_{signal, 3}$.

When data $D_{signal, 4}$ is processed, two nodes $N_{1,L_1}$ and $N_{2,L_1}$ currently exist in level $L_i$. Therefore, data $D_{signal, 4}$ can be compared with each centroid of these two nodes, in compliance with operation 410. In the example of FIG. 5, this comparison did not meet any acceptance threshold of any nodes. Therefore, a new node $N_{3,L_1}$ is created.

If the centroid of a node is calculated based on an average of data corresponding to this node, then since this new node $N_{3,L_1}$ is at this stage only associated with this new data $D_{signal, 4}$, the centroid of this new node $N_{3,L_1}$ can be set equal to this new data $D_{signal, 4}$.

After all data has been processed, a plurality of nodes can be created in level $L_1$ (in some embodiments, only one node can be created—this is however not limitative).

In the example of FIG. 5, three nodes $N_{1,L_1}$, $N_{2,L_1}$ and $N_{3,L_1}$ have been created.

Each data of the data set is associated with one node of level $L_1$. Each node is associated with a centroid reflecting data that has been associated with this node. In addition, each node is associated with an acceptance threshold.

Figure 6:
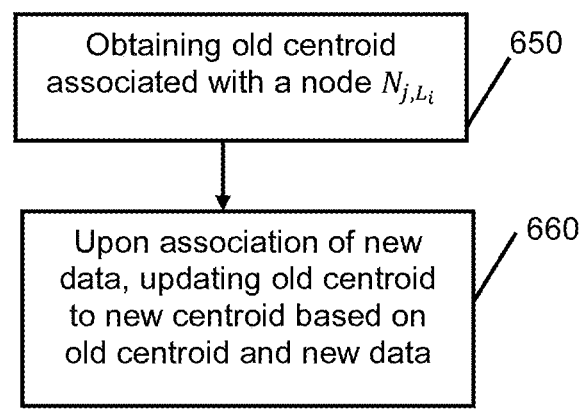
FIG. 6 depicts an embodiment of a method of updating a centroid of a node.

Attention is now drawn to FIG. 6 which depicts a method of updating the centroid of a node. This method can be used for any node of any level of the clustering structure, during e.g. building of the clustering structure, verification of the levels, update of the clustering structure upon receiving new data, etc.

As explained above, the centroid of a node can be calculated based on data associated with this node. Assume a function F(data) is used to determine the centroid of a node.

Assume that the centroid $C_{N_j,L_i}^{old}$ of a node $N_{j,L_i}$ has been calculated based on data $D_{old}$ (see operation 650), and that new data $D_{new}$ has now been associated with the node.

It is now desired to update $C_{N_j,L_i}^{old}$ to $C_{N_j,L_i}^{new}$ in order to take into account $D_{new}$.

According to some embodiments, the centroid $C_{N_j,L_i}^{new}$ can be calculated without requiring accessing to $D_{old}$, but only based on $C_{N_j,L_i}^{old}$ and $D_{new}$ (operation 660).

In a computer, calculation of current data generally relies on data stored in the random access memory (RAM).

This method avoids the need of importing each time the whole set of old data $D_{old}$ in the RAM of the computer.

A simple example will now be provided when function F is an average function. However, this is not limitative, and the method can be used for other functions. Assume $D_{old}$ comprises data $D_1$ to $D_K$ and $D_{new}$ is data $D_{K+1}$. Therefore, $$C_{N_j,L_i}^{old} = \frac{1}{K}\sum_{i=1}^{K} D_i$$

The following relationship can be established:

$$C_{N_j,L_i}^{new} = \frac{1}{K+1}\sum_{i=1}^{K+1} D_i$$

$$\Leftrightarrow C_{N_j,L_i}^{new} = \frac{1}{K+1}\left[D_{K+1} + \sum_{i=1}^{K} D_i\right]$$

$$\Leftrightarrow C_{N_j,L_i}^{new} = \frac{D_{K+1}}{K+1} + \frac{1}{K+1}\sum_{i=1}^{K} D_i$$

$$\Leftrightarrow C_{N_j,L_i}^{new} = \frac{D_{K+1}}{K+1} + \frac{K}{K+1} C_{N_j,L_i}^{old}$$

In light of the foregoing, new centroid $C_{N_j,L_i}^{new}$ can be calculated based only on old centroid $C_{N_j,L_i}^{old}$ and on new data $D_{K+1}$.

According to some embodiments, the building method can comprise a verification method. This verification method can comprise operations to improve the precision of the clustering of the data into a plurality of nodes in a level (this method can be used for the first level, and/or also for other levels). Indeed, it may occur that given data is associated with a node due to its time of arrival (that is to say the time at which it was processed) but in fact, this data should be associated with another node (which e.g. was not yet created at the time this data was processed), or should be associated with a new node.

Figure 7:
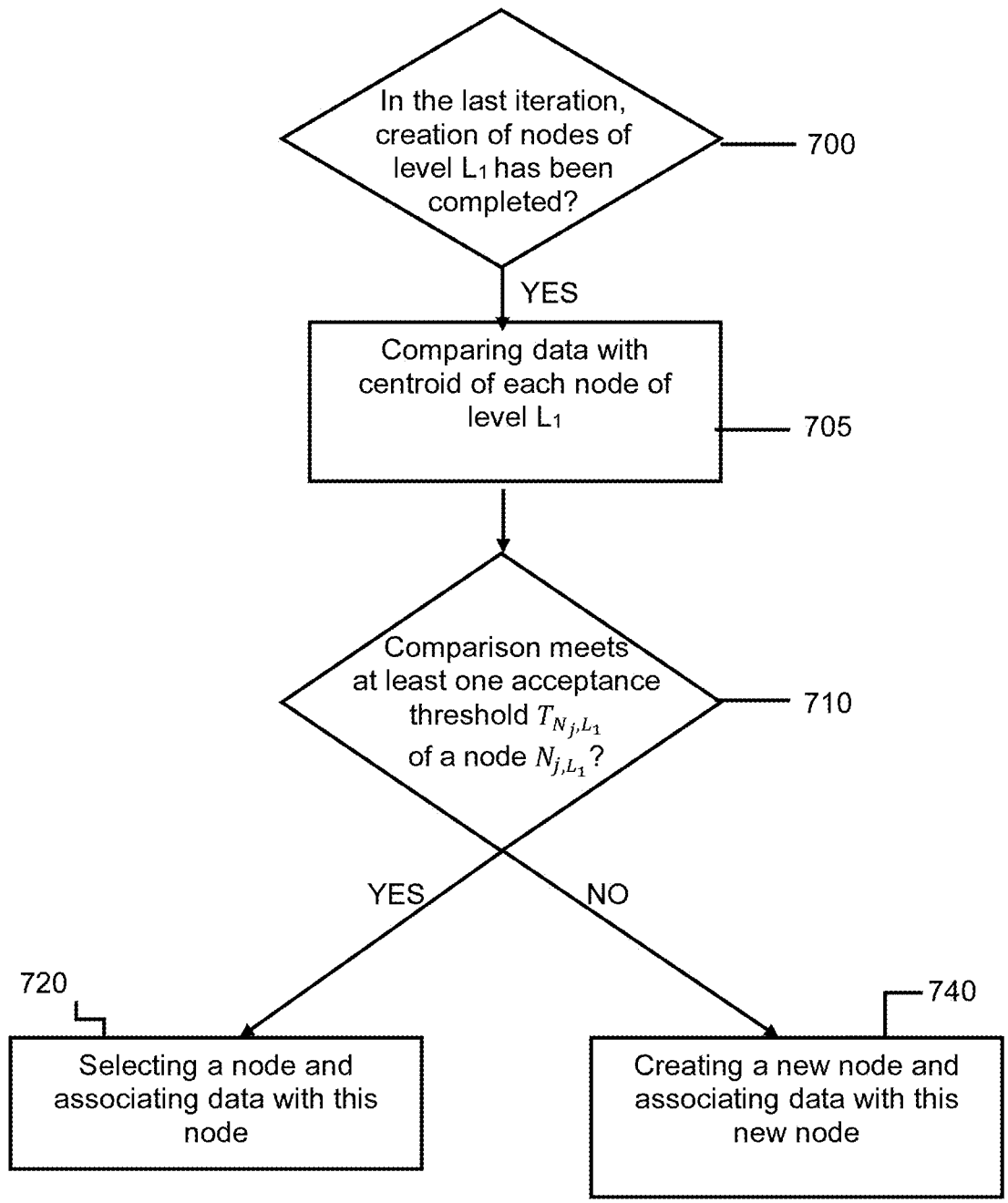
FIG. 7 depicts an embodiment of a method of verifying nodes of the first level.

A possible embodiment of such a verification method is described in FIG. 7 for nodes of level $L_1$. A similar method will be described for nodes of other levels.

After all nodes of level $L_1$ have been created (and each data $D_{signal, 1}, \ldots, D_{signal, Z}$ has been associated with a node), a given number of nodes $N_{j,L_i}$ is obtained (see reference 700 in FIG. 7). Each node is associated with an acceptance threshold and a centroid. In addition, each node is associated with some data of the plurality of data ($D_{signal, 1}, \ldots, D_{signal, Z}$).

The verification method can comprise attempting to associate each data of said plurality of data ($D_{signal, 1}, \ldots, D_{signal, Z}$) with a node $N_{j,L_1}$, by determining whether a comparison of this data with the corresponding centroid $C_{N_j,L_1}$ matches a threshold $T_{N_j,L_1}$.

In other words, the verification method comprises performing again a process of assigning data to the nodes, using the nodes that were created during the building process. The verification method differs from the previous iteration (building method described in FIG. 7) in that a set of nodes is already available at the beginning of the verification method, whereas in the previous iteration (as shown in FIGS. 4 and 5) not all the nodes were available, and these nodes had to be built progressively.

The verification method comprises (operation 705) comparing each data of said plurality of data ($D_{signal, 1}, \ldots, D_{signal, Z}$) with the centroid $C_{N_j,L_1}$ of each existing node $N_{j,L_1}$ of level $L_1$. Operation 705 is similar to operation 405 but differs from it mainly by the fact that during operation 705 a first set of nodes is already available (with corresponding data, threshold and centroid), whereas in operation 405 a set of nodes is not available, or is only partially available, since it is currently and progressively being built.

Similarly to the process described in FIG. 4, if a comparison between the data and a centroid $C_{N_j,L_1}$ of a node $N_{j,L_1}$ of level $L_1$ matches (reference 710) the acceptance threshold $T_{N_j,L_1}$, this indicates that this data can belong to a category represented by this node $N_{1,L_1}$, and that this data can be associated with this node $N_{j,L_1}$.

For a given data, if this comparison matches the acceptance threshold $T_{N_j,L_1}$ of each of a plurality of nodes $N_{j,L_1}$ (and not only of a single node), then the method can comprise selecting (operation 720) a single node among these plurality of nodes, and associating this data with this single node.

If the comparison did not meet an acceptance threshold $T_{N_j,L_1}$ of any of nodes $N_{j,L_1}$ of level $L_1$, the method can comprise, according to some embodiments, creating (operation 740) a new node in level $L_1$.

The centroid of this new node can be calculated based on this data.

According to some embodiments, operation 720 (performed during the verification method) can differ from operation 420 in that following operation 720, the centroid of the node is not updated (however, see hereinafter that the centroid can be updated after completion of one iteration of the whole verification method), whereas following operation 420, the centroid of the node is generally updated accordingly (as shown in operation 730).

According to some embodiments:
- before completion of one iteration of the verification method, the centroid of the nodes that already existed (corresponding to nodes already built previously, e.g. following the method of FIG. 4, or following a previous iteration of the verification method) is not updated following operation 720; but
- the centroid of the nodes that are created during the verification method (that is to say during operation 740) is updated progressively (depending on the data that is associated with this node during the verification method).

This is however not mandatory and in some embodiments, the centroid of all nodes can be updated progressively following operation 720.

Operations 705, 710, 720 or 740 can be repeated until all data $D_{signal, 1}, \ldots, D_{signal, Z}$ has been processed and (possibly) associated with a node.

Figure 8:
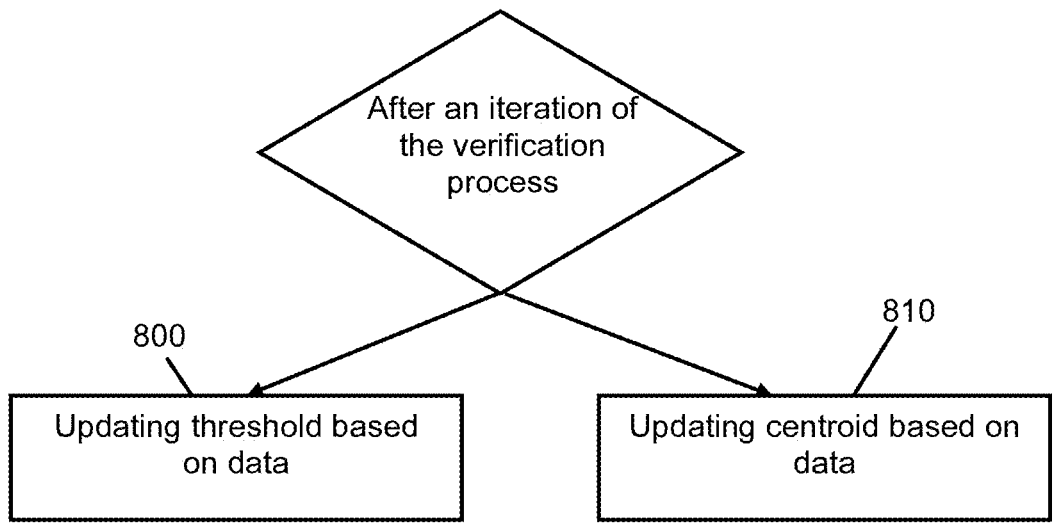
FIG. 8 depicts an embodiment of a method of updating parameters of the nodes after verification of the nodes.

Following one iteration of the verification method, the method can comprise updating the centroid of the nodes (see operation 810 in FIG. 8). This update can comprise obtaining data associated with each node (or of at least some of the nodes) and updating the centroid of this node accordingly, by using the function that was selected to compute the centroid of the nodes.

Following one iteration of the verification method, the method can comprise updating the threshold of the nodes (see operation 800 in FIG. 8).

Figure 9:
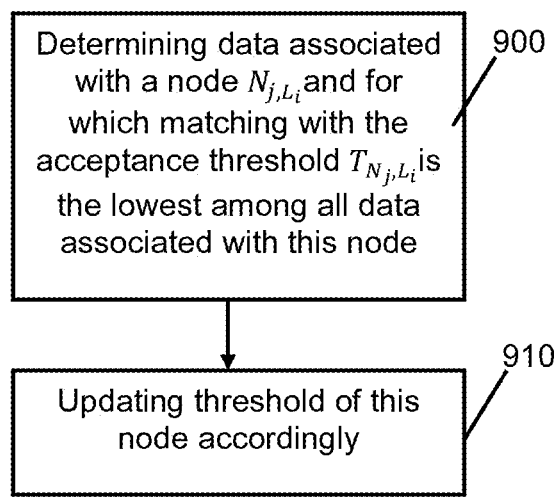
FIG. 9 depicts an embodiment of a method of updating thresholds of the nodes.

A possible embodiment of updating threshold of the nodes is described with reference to FIG. 9.

It has to be noted that this method can be used after the verification method, but can also be used at different stages of the building process of the clustering structure, or at different stages of the update of the clustering structure when new data are received, and for any level of the clustering structure.

Figure 10:
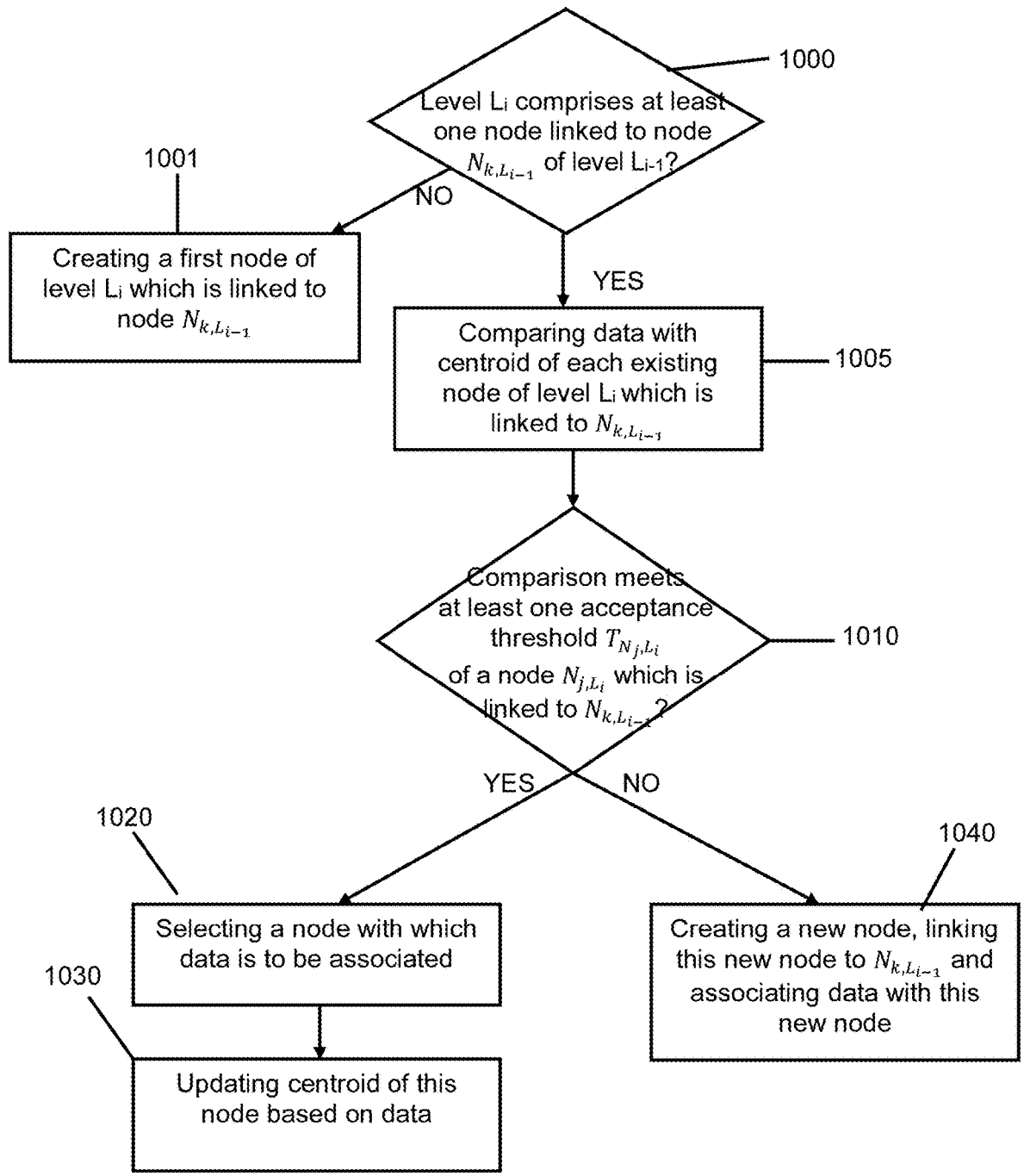
FIG. 10 depicts an embodiment of a method of building subsequent levels of the clustering structure.

In addition, it is possible to omit the verification method and to update directly the acceptance threshold of the nodes (for example once all relevant data has been assigned to a node using the method of FIG. 4 for the first level or FIG. 10 for subsequent levels).

Assume a threshold $T_{N_j,L_i}$ of a node $N_{j,L_i}$ has to be updated.

The method can comprise, at a given time t, determining (operation 900) data (hereinafter $D_{low}$) associated with a node $N_{j,L_i}$ and for which matching with the acceptance threshold $T_{N_j,L_i}$ is the lowest (or in some embodiments, one of the lowest, according to some criteria or threshold) among all data associated with the node.

In other words, this data $D_{low}$ was identified as sufficiently matching the category of the node (assume the comparison of this data $D_{low}$ with the centroid of this node provided a matching equal to $T_{low}$, with $T_{low}$ matching threshold $T_{N_j,L_i}$), but, among all other data that also sufficiently matches this category, this data $D_{low}$ has the lowest matching (or in some embodiments, one of the lowest matching).

The method can comprise (operation 910) updating the threshold of the node based on $D_{low}$. In particular, the threshold $T_{N_j,L_i}$ can be updated based on the level of matching of $D_{low}$ with the centroid of this node, that it to say, based on the value $T_{low}$. In some embodiments, the threshold $T_{N_j,L_i}$ can be updated to be equal to $T_{low}$.

Following one iteration of the verification method, different scenarios can generally occur.

In some cases (scenario 1), the number of nodes following iteration of the verification method is not the same as the number of nodes obtained following the method of FIG. 4 (first building of nodes of a level). In other words, new nodes have been created (this means that operation 740 has been performed at least once).

Concerning the nodes that already existed following the method of FIG. 4 (first building of a level), in some cases, at least some parameters of these nodes can be different (that is to say that data associated with these nodes can be different, and at least one of the centroid and the threshold of these nodes has been changed following the verification method).

In some cases (scenario 2), the number of nodes following iteration of the verification method is the same as the number of nodes obtained following the method of FIG. 4 (first building of a level), but at least some nodes are associated with different data (therefore, at least one of the centroid and the threshold of these nodes has been changed following the verification method).

In some cases (scenario 3), the number of nodes following iteration of the verification method is the same as the number of nodes obtained following the method of FIG. 4 (first building of a level), and the data associated with these nodes is the same, but at least one of the centroids and the threshold of these nodes has been changed following the verification method.

In some cases (scenario 4), the number of nodes following the iteration of the verification method is lower than the number of nodes obtained following the method of FIG. 4 (first building of a level). In other words, at least one node, which was created during the method of FIG. 4, was not associated with any of the data during the verification process, and therefore can be removed.

In some cases (scenario 5), following the verification method, the nodes and their parameters (data associated with the nodes, centroid and threshold) are the same as following the method of FIG. 4 (first building of a level).

In the example of FIG. 5, scenario 2 occurs. The number of nodes is the same, but the parameters of the nodes has been changed during an iteration of the verification process.

According to some embodiments, the verification process can be performed more than one time.

In particular, in at least one of scenarios 1, 2, 3 and 4, the verification process can be repeated. Concerning scenario 5, since the verification process did not change any of the nodes, it is not useful to repeat again the verification process (indeed, this can indicate that the verification process has already converged).

In some embodiments, the verification process can be repeated (operations 705, 710, 720 or 740) until a convergence is obtained, that it to say that between two iterations, nodes and parameters of the nodes remain the same. This is however not mandatory.

It has been described that a plurality of nodes can be created for the first level. It has to be noted that according to some embodiments, it is not necessary to predefine a threshold for the nodes of the first level (for example, this could be equal to zero). Indeed, as mentioned e.g. with reference to FIG. 9, data associated to a node can dictate the acceptance threshold that needs to be assigned to this node. Therefore, even if an acceptance threshold is not defined a priori for a level, the method can operate, by determining dynamically the relevant acceptance threshold based on the data itself. A difference between setting a priori a threshold for a level and waiting for the data to dictate the threshold by itself, is that convergence is generally faster when at least some initialization threshold was provided. The fact that the data itself can dictate the acceptance threshold applies to all levels of the clustering structure, and not only to the first level.

Once first level $L_1$ has been created, additional level(s)/layer(s) can be created.

Attention is drawn to FIG. 10.

The method can comprise applying a method similar to the method of FIG. 4 in order to build nodes of subsequent levels $L_i$ with i>1.

Assume nodes of level $L_{i-1}$ were already created, and that node(s) of level $L_i$ need to be created (for example $L_1$ was created, and $L_2$ needs to be created).

Assume level $L_{i-1}$ comprises nodes $N_{j,L_{i-1}}$ (with j from 1 to $j_{Li-1,max}$). As already mentioned, each node is associated with data which is part of the data set ($D_{signal, 1}, \ldots, D_{signal, Z}$).

Assume $N_{k,L_{i-1}}$ is associated with data ($D_{signal, P}, \ldots, D_{signal, P+M}$).

Based on node $N_{k,L_{i-1}}$ ("parent node"), nodes $N_{j,L_i}$ of level $L_i$ which are linked to this parent node $N_{k,L_{i-1}}$ can be created. This link indicates that each data belonging to a category represented by node $N_{j,L_i}$ belongs to a category represented by node $N_{k,L_{i-1}}$. In other words, category represented by node $N_{j,L_i}$ is in fact a sub-category of the category represented by node $N_{k,L_{i-1}}$.

Data associated to parent node $N_{k,L_{i-1}}$ is processed according to the method of FIG. 10 (which is similar to the method of FIG. 4) in order to create nodes of level $L_i$ which are linked to this parent node $N_{k,L_{i-1}}$.

When first data $D_{signal, P}$ associated to parent node $N_{k,L_{i-1}}$ is processed, if level $L_i$ does not comprise any node $N_{j,L_i}$ which is linked to parent node $N_{k,L_{i-1}}$, the method can comprise creating a new node $N_{j,L_i}$ (see reference 1000 and 1001 in FIG. 10). This new node is linked to parent node $N_{k,L_{i-1}}$, and this link can be stored e.g. in memory 220.

Operation 1001 is similar to operation 401.

Centroid of new node $N_{1,L_i}$ which is linked to $N_{k,L_{i-1}}$ can be determined based on first data $D_{signal, P}$ associated to new node $N_{1,L_i}$. Assume an example in which a centroid is calculated based on an average of data associated to a node. Therefore, in the present example, $C_{N_1,L_i}$ can be determined based on data $D_{signal, P}$, and can be set equal to this data $D_{signal, 1}$.

Concerning the acceptance threshold of nodes $N_{j,L_i}$ which are linked to parent node $N_{k,L_{i-1}}$, according to some embodiments, this acceptance threshold can be set (at least initially) equal to the acceptance threshold of parent node $N_{k,L_{i-1}}$.

According to some embodiments, this acceptance threshold can be predefined by a user, or pre-stored in a memory.

The method can further comprise processing other data ($D_{signal, P+1}, \ldots, D_{signal, P+M}$) associated with parent node $N_{k,L_{i-1}}$.

For each of this data, the method can comprise comparing (operation 1005) each data ($D_{signal, P+1}, \ldots, D_{signal, P+M}$) to each centroid $C_{N_j,L_i}$ of each node $N_{j,L_i}$ of level $L_i$ which is linked to parent node $N_{k,L_{i-1}}$. Operation 1005 is similar to operation 405 performed for the first level.

If a comparison between this data and a centroid $C_{N_j,L_i}$ of a node of level $L_i$ which is linked to parent node $N_{k,L_{i-1}}$ matches (reference 1010) the acceptance threshold $T_{N_j,L_i}$, this indicates that this data can belong to a category represented by this node $N_{j,L_{i1}}$ and that this data can be associated with this node $N_{j,L_i}$.

For a given data, if this comparison matches the acceptance threshold $T_{N_j,L_{i1}}$ of each of a plurality of nodes $N_{j,L_i}$ (and not only of a single node), then the method can comprise selecting (operation 1020) a single node among the plurality of nodes.

For example, the selected node can be the node for which the comparison matches the best the acceptance threshold $T_{N_j,L_i}$.

Since the data is now associated with this selected node, the method can comprise updating (operation 1030) the centroid of this selected node. This update takes into account the new data that has been associated to this selected node at this stage.

For example, if the centroid is determined based on an average of the data associated to this node, then the updated centroid can be determined by taking into account this data in the computation of the new average.

If another function F is used to determine the centroid based on the data associated to the node, then this function F can be used to take into account this new data for updating the centroid.

If the comparison did not meet an acceptance threshold $T_{N_j,L_i}$ of any of nodes $N_{j,L_i}$ of level $L_i$ which is linked to $N_{k,L_{i-1}}$, the method can comprise, according to some embodiments, creating (operation 1040) a new node in level $L_i$ and associating the data with this new node. This new node is linked to parent node $N_{k,L_{i-1}}$.

The method can comprise storing in a memory, at least temporarily, an information representative of the fact that this data is now associated with this new node.

In addition, the method can comprise storing in a memory the link between this new node and parent node $N_{k,L_{i-1}}$.

The centroid of this new node can be calculated based on this data.

If the centroid of a node is calculated based on an average of data corresponding to this node, then since this new node is at this stage only associated with this new data, the centroid of this new node can be set equal to this new data.

Operations 1005, 1010, 1020, 1030 (or 1040) can be repeated for each data associated with parent node $N_{k,L_{i-1}}$.

As a consequence, children nodes associated with the parent node can be obtained in level $L_i$. This can be performed for each parent node $N_{k,L_{i-1}}$ of level $L_{i-1}$. Depending on the data, it can happen that some of the parent nodes will not generate any children node (for example the children node is equal to the parent node and therefore, it is as if there was no children node for this parent node).

Figure 11:
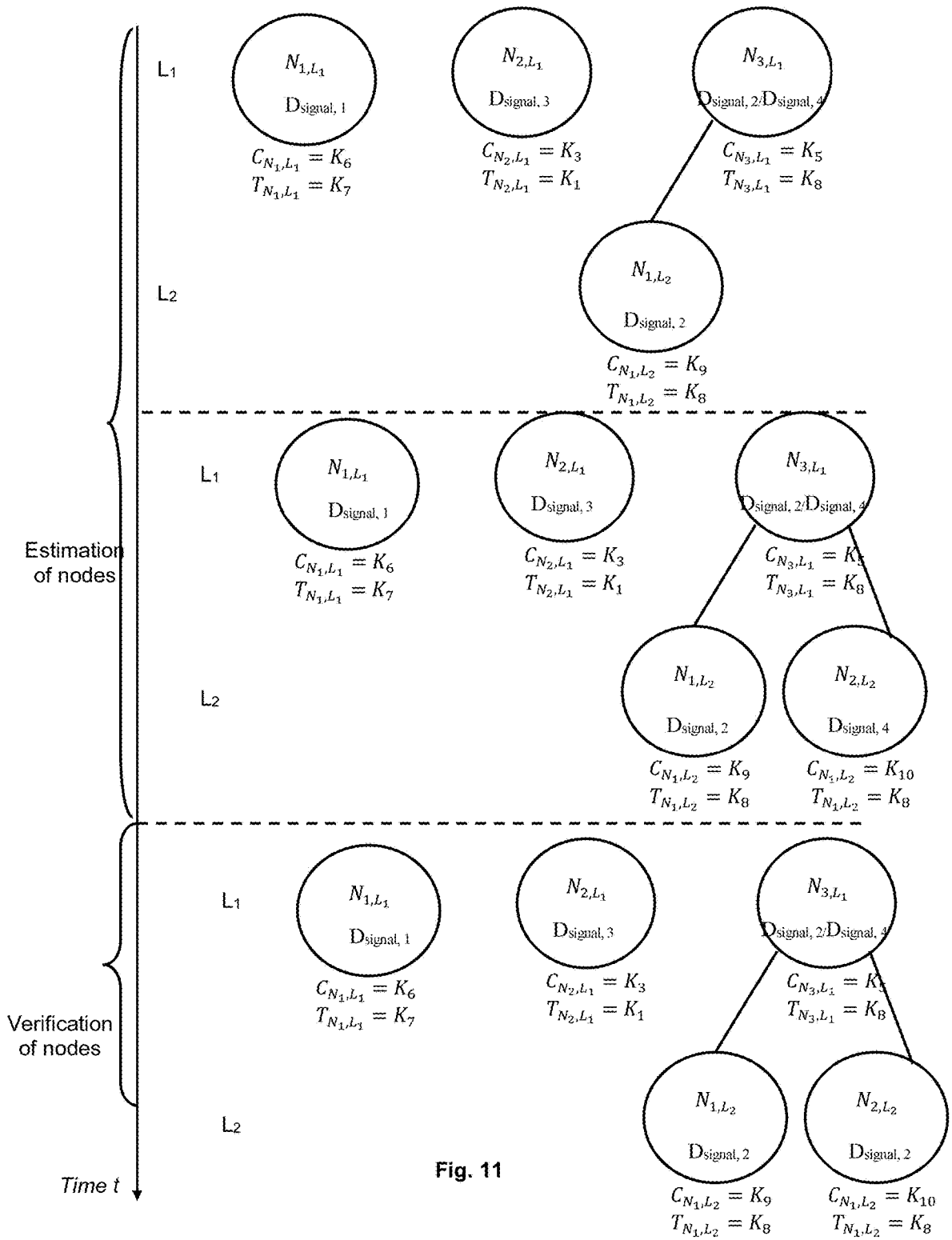
FIG. 11 depicts a non-limitative example of the method of FIG. 10.

A non-limitative example of the method of FIG. 10 is provided in FIG. 11 (which pursues the example of FIG. 5).

As shown, it is attempted to create children nodes for parent node $N_{3,L_1}$. Parent node $N_{3,L_1}$ is associated with data $D_{signal, 2}$ and $D_{signal, 4}$.

At the beginning, when data $D_{signal, 2}$ is processed, there is no children node associated to parent node $N_{3,L_1}$. Therefore, new node $N_{1,L_2}$ is created. Centroid $C_{N_1,L_2}$ can be calculated based on data $D_{signal, 2}$ (see above various methods for calculating the centroid). The acceptance threshold of node $N_{1,L_2}$ is set equal in this example to the acceptance threshold $T_{N_3,L_1}$ of parent node $N_{3,L_1}$.

When data $D_{signal,\ 4}$ is processed, node $N_{1,L_2}$ already exists. Therefore, data $D_{signal,\ 4}$ is compared to centroid $C_{N_1,L_2}$. However, this comparison does not meet the acceptance threshold $T_{N_1,L_2}$ and therefore a new node $N_{2,L_2}$ is created. New node $N_{2,L_2}$ is linked to parent node $N_{3,L_1}$. Data $D_{signal,\ 4}$ is associated with this new node $N_{2,L_2}$. Centroid $C_{N_2,L_2}$ can be calculated based on data $D_{signal,\ 4}$ (see above various methods for calculating the centroid). The acceptance threshold of node $N_{2,L_2}$ is set equal in this example to the acceptance threshold $T_{N_3,L_1}$ of parent node $N_{3,L_1}$.

Similarly to what was described in FIG. 7, a verification method (see FIG. 12) can be applied to the nodes that have been created based on parent node $N_{k,L_{i-1}}$.

This verification method is similar to the method described above with reference to FIG. 7. Since a detailed description was already provided for the method of FIG. 7, one can refer to the various alternatives provided for this method and which can be used, mutadis mutandis, for the method of FIG. 12.

Figure 12:
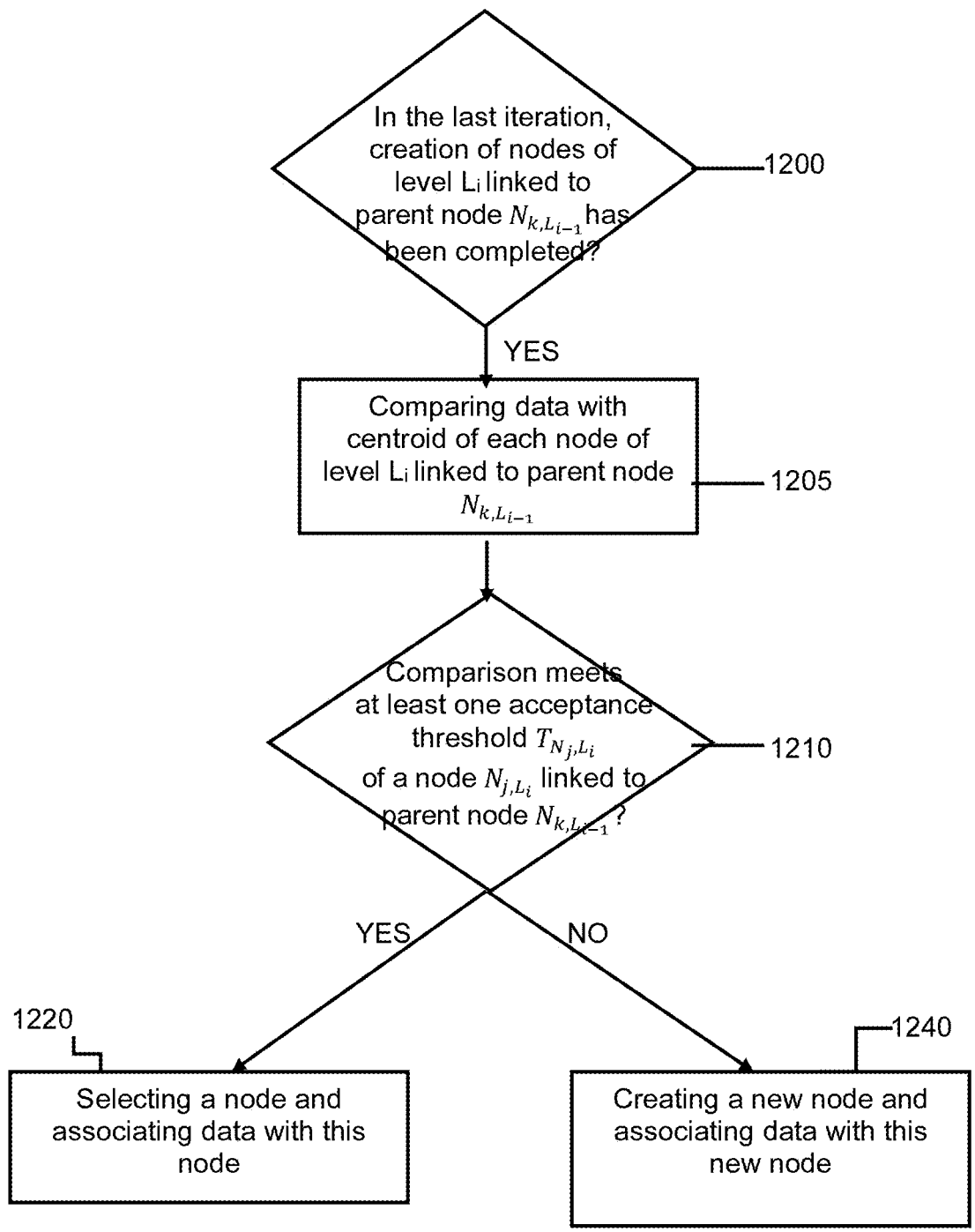
FIG. 12 depicts an embodiment of a method of verifying nodes of subsequent levels.

One main difference is that in FIG. 7, an iteration of the method is generally performed for all data and for all nodes of level $L_1$, whereas the method of FIG. 12 may be applied, if this is desired, only to data associated to parent node $N_{k,L_{i-1}}$ and to the nodes $N_{j,L_i}$ which are linked to parent node $N_{k,L_{i-1}}$. One consequence is that the verification method of nodes linked to parent node $N_{k,L_{i-1}}$ can be performed using a different processor, or a different thread, and/or at a different time that the verification method of other nodes $N_{j,L_i}$ linked to another parent node $N_{k,L_{i-1}}$. In other words, the organization in nodes and levels allows creating different independent paths, therefore allowing processing of these different paths independently (both in terms of estimation of nodes—as in FIG. 10—and verification of nodes—as in FIG. 12).

This can be seen for example in FIG. 11, in which the verification method is performed for nodes $N_{1,L_2}$ and $N_{2,L_2}$ which are linked to parent node $N_{3,L_1}$ while the data associated to the other parent nodes $N_{1,L_1}$ and $N_{2,L_1}$ has not yet been processed in order to create the corresponding children nodes in level $L_2$.

The verification method can comprise (after a first estimation of nodes $N_{j,L_i}$ linked to parent node $N_{k,L_{i-1}}$—see reference 1200) comparing data with centroid of each existing node $N_{j,L_i}$ of level $L_i$ linked to parent node $N_{k,L_{i-1}}$ (operation 1205). For example, in the example of FIG. 11, $D_{Signal,\ 2}$ is compared to centroid $C_{N_1,L_2}$ of node $N_{1,L_2}$ and to centroid $C_{N_2,L_2}$ of node $N_{2,L_1}$. After $D_{Signal,\ 2}$ has been processed and assigned to a node, $D_{Signal,\ 4}$ is compared to centroid $C_{N_1,L_2}$ of node $N_{1,L_2}$ and to centroid $C_{N_2,L_2}$ of node $N_{2,L_1}$.

Operation 1205 is generally similar to operation 705 and one can refer to the description of operation 705.

If a comparison between the data and a centroid $C_{N_j,L_i}$ of a node $N_{j,L_i}$ of level $L_i$ linked to parent node $N_{k,L_{i-1}}$ matches (reference 1210) the acceptance threshold $T_{N_j,L_i}$, this indicates that this data can belong to a category represented by this node $N_{j,L_i}$ which is itself linked to parent node $N_{k,L_{i-1}}$, and that this data can be associated with this node $N_{j,L_i}$.

For a given data, if this comparison matches the acceptance threshold $T_{N_j,L_i}$ of each of a plurality of nodes $N_{j,L_i}$ (and not only of a single node) linked to parent node $N_{k,L_{i-1}}$, then the method can comprise selecting (operation 1220) a single node among the plurality of nodes, and associating this data with this single node.

Operation 1210 is similar to operation 710 and one can refer to the description of operation 710.

Operation 1220 is similar to operation 720 and one can refer to the description of operation 720.

If the comparison did not meet an acceptance threshold $T_{N_j,L_i}$ of any of nodes $N_{j,L_i}$ of level $L_i$ linked to parent node $N_{k,L_{i-1}}$, the method can comprise, according to some embodiments, creating (operation 1240) a new node in level $L_i$ which is linked to parent node $N_{k,L_{i-1}}$.

The centroid of this new node can be calculated based on this data.

As already mentioned with reference to FIGS. 6 and 7, the centroid of at least some nodes can be updated at the end of one iteration of the verification method, or during the verification method itself.

Concerning the acceptance threshold, as already mentioned with reference to FIGS. 7 and 8, in some embodiments this acceptance threshold can be adapted based on the data associated to the node.

As already mentioned above, the verification method can be repeated more than once.

In the example of FIG. 11, following the verification method, nodes $N_{1,L_2}$ and $N_{2,L_2}$, and their parameters, remain unchanged.

The method of FIG. 10 can be applied to each parent node $N_{k,L_{i-1}}$ of level $L_{i-1}$ with i>1. The same applies to the verification method which can be applied to verify the nodes that have been created following the method of FIG. 10. As a consequence, starting from nodes of a level $L_{i-1}$ with i>1, new nodes of a level $L_i$ are created. This can be applied recursively in order to build a complete clustering structure.

For example, in FIG. 11, the method of FIG. 10 can be applied also to parent nodes $N_{1,L_1}$ and $N_{2,L_1}$. The same applies to the verification method which can be applied to verify the nodes that have been created following the method of FIG. 10. Therefore, in the example of FIG. 11, the method of FIG. 10 can be applied again to nodes $N_{1,L_1}$ and $N_{2,L_1}$.

In some cases, some of the parent nodes of level $L_{i-1}$ will not provide additional children nodes in level $L_i$ (this can indicate that for this path the differentiation between the data is already precise enough in level $L_{i-1}$) whereas some parent nodes will still provide additional children nodes (this indicates that data can be further differentiated).

Various methods can be used to indicate at which stage the building of the clustering structure can be stopped.

According to some embodiments, it can be defined (e.g. by a user, or as a pre-stored rule in memory 220) that building of the structure is stopped when one or more of the following condition(s) is/are met.

For all nodes for which all data belonging to this node matches the centroid of this node with a level of matching which complies with a stopping threshold $T_S$, then it is not attempted to build any more children nodes for these nodes using the method of FIG. 10.

For example, it can be defined that when data of nodes meets the corresponding centroid of their node with a level of matching which is equal or higher than a stopping threshold of $T_S$=0.9 or 0.99, then building of the clustering structure can be stopped (meaning that at this step it is not attempted to create further nodes in additional levels). These values are however not limitative.

It has been mentioned above (see FIG. 7) that in some embodiments, the acceptance threshold of a node can be updated based on the data associated to this node. In particular, in some embodiments, the acceptance threshold is set equal to the lowest level of matching of the data associated with a node. In this case, the condition mentioned above can be monitored by checking when the acceptance threshold of all nodes (after update) meets the value $T_S$, and then building of the clustering structure can be stopped.

In other embodiments, it can be defined (e.g. by a user, or as a pre-stored rule in memory 220) that building of the clustering structure is stopped when the number of levels meets a threshold.

In some embodiments, the acceptance threshold of all nodes of a level can be pre-set (and is not necessarily updated based on the data). For example, it can be set that for level $L_1$, the acceptance threshold is $K_1$, for level $L_2$, the acceptance threshold is $K_2$, etc. (with $K_{i+1}$ being more strict than $K_i$).

In this case, it can be decided that the building of the clustering structure is stopped when a minimal number M of levels has been created (for all paths, or for at least some of the paths). This indicates that the data of level M all meets the centroid of their node with a level of matching which complies with the predefined acceptance threshold $K_M$. If the user indicates a value for $K_M$, then the system can automatically calculate M and can instruct when the building of the clustering structure should be stopped.

Figure 13:
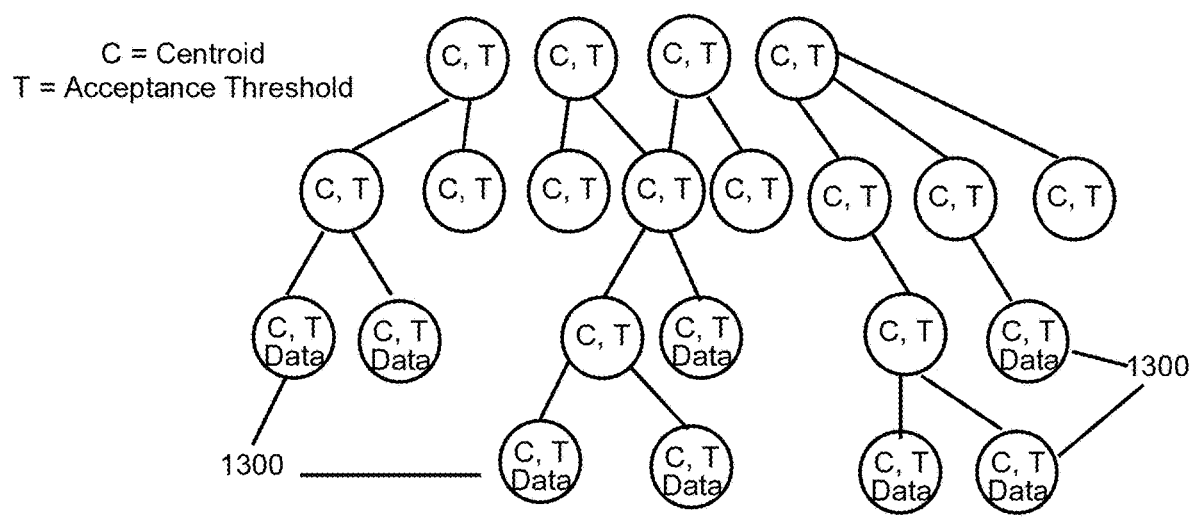
FIG. 13 depicts a non-limitative example of a clustering structure.

A non-limitative example of a clustering structure is provided in FIG. 13. As shown, after completion of the building of the clustering structure, a plurality of nodes organized in hierarchical levels/layers is obtained. For each node, a centroid and an acceptance threshold is stored. The association between the data and each node (this association was determined during building of the clustering structure, as explained above) is not necessarily kept stored in a memory for each intermediate node. However, according to some embodiments, the association between the data and the end nodes 1300 of the clustering structure (that is to say nodes which do not have children nodes) can be stored in a memory. Indeed, these end nodes represent the most precise categories of the clustering structure, and can represent relevant categories for the user.

As explained above, it is not necessary to define a priori the number of categories and their content. Once the nodes have been created, this indicates that each node represents a category but the system does not necessarily know at this stage the content of this category. For example, assume a plurality of files of a firm have been clustered using the methods described above. The end nodes of the clustering structure will automatically each represent a different category (for example, a first end node will comprise "receipts", a second end node will comprise "invoices", etc. but the system does not necessarily have an a priori knowledge of the name of each category). In some embodiments, the nature/name of each category can be deducted e.g. by the system from the content of the data stored in a given node. Assume that at least some of the files of an end node have a tag indicating that they belong to a receipt or to an invoice file. Then if this tag "receipt" is detected in one file or in a plurality of files of the node, this indicates that this node represents "receipts". If the tag "invoice" is detected in one file of the node, this indicates that this node represents "invoice", etc. In other words, the system can deduct the nature of a node based on characteristics of data associated with this node.

Figure 14:
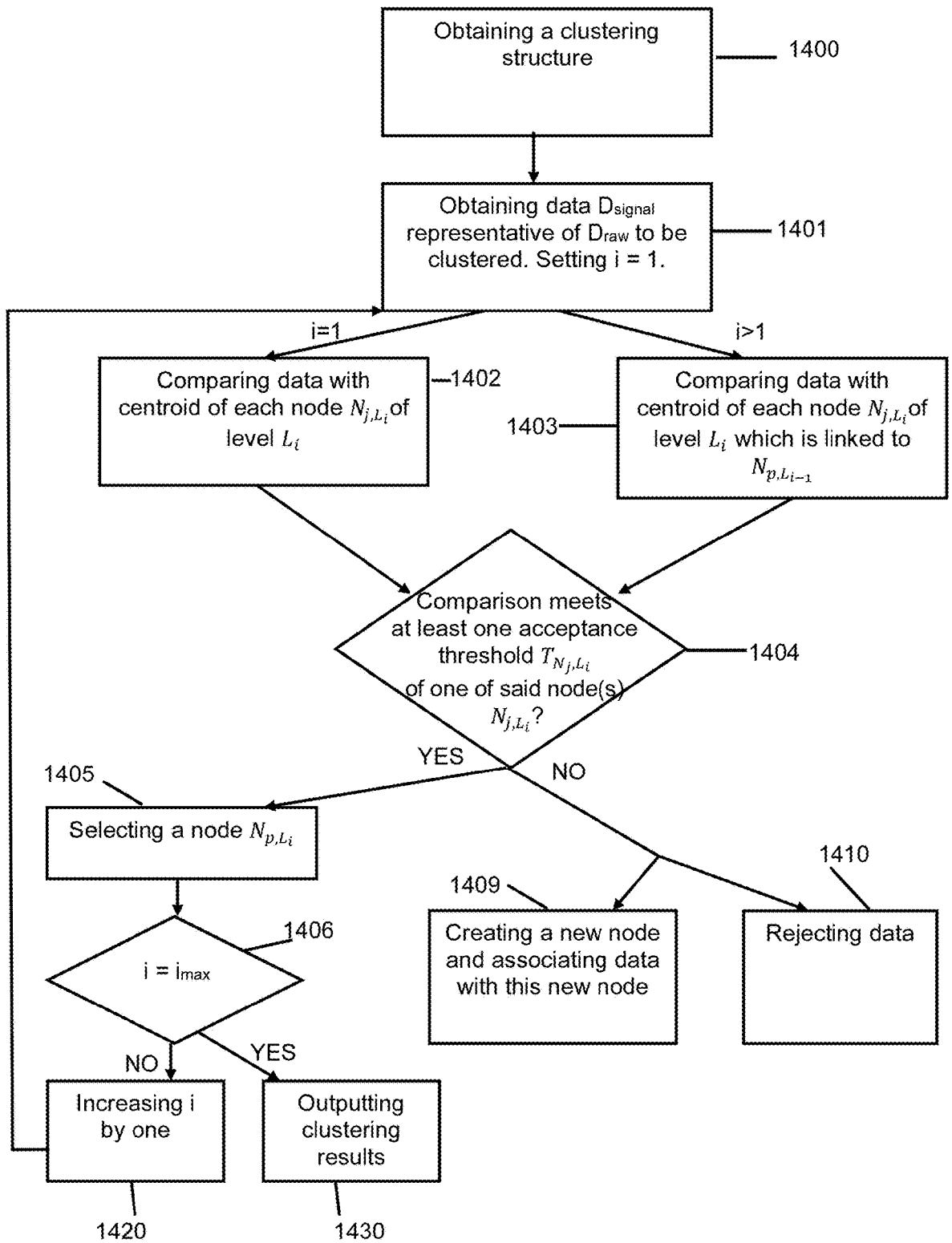
FIG. 14 depicts a method of clustering data (such as files) using the clustering structure.

Attention is now drawn to FIG. 14, which depicts a method of clustering data using the clustering structure.

Assume a clustering structure has been built using the various methods described above (see reference 1400). As already explained, this clustering structure comprises comprising a plurality of nodes $N_{j,L_i}$ arranged in hierarchical levels/layers $L_i$, with i from 1 to N. Each node $N_{j,L_i}$ is representative of a category of data sharing similarities. Each node $N_{j,L_i}$ of level $L_i$ is linked to a node $N_{k,L_{i-1}}$ of an upper level $L_{i-1}$, with i from 2 to N, thereby indicating that each data belonging to a category represented by node $N_{j,L_i}$ belongs to a category represented by node $N_{k,L_{i-1}}$. Each node $N_{j,L_i}$ is associated with at least one acceptance threshold $T_{N_j,L_i}$, and with at least one centroid $C_{N_j,L_i}$ representative of data belonging to a category represented by this node $N_{j,L_i}$.

The method comprises obtaining (operation 1401) data $D_{signal}$ representative of a piece of data $D_{raw}$ to be assigned to a category. Various examples have been provided above for $D_{signal}$ and $D_{raw}$. For example, $D_{raw}$ is a file and $D_{signal}$ is a vector or matrix representative of the binary content of this file. This is however not limitative.

It is now desired to cluster this data using the clustering structure. This data is typically new data that was not used in the data set from which the clustering structure was built using the methods described above. Indeed, if this data was already processed during the building of the clustering structure, then the system can detect that similar data is already associated e.g. with an end node of the clustering structure, and can output the corresponding category.

The method comprises, for i=1, comparing $D_{signal}$ to each centroid $C_{N_j,L_i}$ of each node $N_{j,L_i}$ of level $L_i$ (operation 1402).

In other words, it is attempted to identify which node of the first level $L_1$ matches the best data $D_{signal}$.

If this comparison meets an acceptance threshold $T_{N_j,L_i}$ of a plurality of nodes $N_{j,L_1}$ (operation 1404), the method comprises selecting (operation 1405) a node $N_{p,L_1}$ among the nodes $N_{j,L_1}$ for which this comparison meets this acceptance threshold $T_{N_j,L_i}$. For example, $N_{p,L_1}$ can be the node for which the level of matching between data $D_{signal}$ and $C_{N_p,L_1}$ is the best among all nodes.

If the comparison meets an acceptance threshold $T_{N_p,L_1}$ of a single node $N_{p,L_1}$, the method comprises selecting (operation 1405) this node $N_{p,L_1}$.

According to some embodiments, centroid $C_{N_p,L_1}$ of node $N_{p,L_1}$ can be updated based on the fact that $D_{signal}$ has been identified as belonging to a category represented by node $N_{p,L_1}$. Embodiments for updating a centroid have been described above.

According to some embodiments, acceptance threshold $T_{N_p,L_1}$ of node $N_{p,L_1}$ can be updated based on the fact that $D_{signal}$ has been identified as belonging to a category represented by node $N_{p,L_1}$. Embodiments for updating an acceptance threshold have been described above. It has to be noted that although the method can let the data influence the acceptance threshold, not all new data will modify this acceptance threshold. Indeed, if the update is performed based on data which has the lowest matching with the centroid of the node, then $D_{signal}$ does not necessarily meet this condition.

At this stage, it has been identified that data $D_{signal}$ belongs to a category represented by $N_{p,L_1}$.

However, if the comparison (operation 1404) does not meet an acceptance threshold $T_{N_j,L_1}$ of any of nodes $N_{j,L_1}$, the method can comprise various operations.

According to some embodiments, the method can comprise "rejecting" the data (operation 1410). This can comprise providing an output that $D_{signal}$ or $D_{raw}$ does not belong to any of the categories of the clustering structure. This output can be e.g. provided to a user through user interface 230.

According to some embodiments, the method can comprise creating (operation 1409) a new node in the level and associating data $D_{signal}$ or $D_{raw}$ with this new node.

In some embodiments, an output can be provided (e.g. to the user) indicating that $D_{signal}$ or $D_{raw}$ belongs to a category represented by a new node.

According to some embodiments, a centroid can be calculated for this new node based on $D_{signal}$. Embodiments for calculating the centroid of a node have been provided above.

In addition, an acceptance threshold can be assigned to this new node. This acceptance threshold can be set by a user, or can be predefined for all nodes of this level.

When data is associated to an existing node of the clustering structure of the first level, it can be attempted to identify which nodes of the subsequent level(s) $L_i$, with i>1, (and which are linked to the node identified in the previous level) match the best data $D_{signal}$.

The method can comprise increasing i by one (see reference 1420—therefore i>1) and comparing $D_{signal}$ to each centroid $C_{N_j,L_i}$ of each node $N_{j,L_i}$ which is linked to node $N_{p,L_{i-1}}$ (identified at the previous iteration in the upper level—see reference 1403).

If this comparison meets an acceptance threshold $T_{N_j,L_i}$ of a plurality of nodes $N_{j,L_i}$ which are linked to $N_{p,L_{i-1}}$, the method comprises selecting (operation 1405) a node $N_{p,L_i}$ among the nodes $N_{j,L_i}$ for which this comparison meets this acceptance threshold $T_{N_j,L_i}$. For example, $N_{p,L_i}$ can be the node for which the level of matching between data $D_{signal}$ and $C_{N_j,L_i}$ is the best. It has to be noted that index "p" can have a different value between two different iterations (two different values of "i") the same index "p" was used only for easing the presentation.

If the comparison meets an acceptance threshold $T_{N_p,L_i}$ of a single node $N_{p,L_i}$, the method comprises selecting (operation 1405) this node $N_{p,L_i}$.

In some embodiments, parameters of node $N_{p,L_i}$ can be updated accordingly.

According to some embodiments, centroid $C_{N_p,L_i}$ of node $N_{p,L_i}$ can be updated based on the fact that $D_{signal}$ has been identified as belonging to a category represented by node $N_{p,L_i}$. Embodiments for updating a centroid have been described above.

According to some embodiments, acceptance threshold $T_{N_p,L_1}$ of node $N_{p,L_i}$ can be updated based on the fact that $D_{signal}$ has been identified as belonging to a category represented by node $N_{p,L_i}$. Embodiments for updating an acceptance threshold have been described above.

At this stage, it has been identified that data $D_{signal}$ belongs to a category represented by $N_{p,L_i}$ in level $L_i$ (and also to a more general category represented by $N_{p,L_{i-1}}$).

The method can be repeated iteratively, by reverting to operation 1403.

However, if the comparison does not meet an acceptance threshold $T_{N_j,L_i}$ of any of nodes $N_{j,L_i}$ which are linked to $N_{p,L_{i-1}}$, the method can comprise various operations, as explained above for the first level.

According to some embodiments, the method can comprise "rejecting" the data (operation 1410).

This can comprise providing an output that $D_{signal}$ or $D_{raw}$ does not belong to any of the categories of level of the clustering structure. This output can be e.g. provided to a user through user interface 230.

This can comprise providing an output that $D_{signal}$ or $D_{raw}$ does not belong to any of the sub-categories represented by node $N_{p,L_i}$ of the clustering structure, but that $D_{signal}$ or $D_{raw}$ belongs to a category represented by node $N_{p,L_{i-1}}$. This output can be e.g. provided to a user through user interface 230.

If the user is interested only in the categories represented by the end nodes (nodes which do not have children nodes in subsequent levels and which represent the narrowest categories), and data $D_{signal}$ could not be assigned to any of these end nodes, the method can comprise providing an output that $D_{signal}$ or $D_{raw}$ does not belong to any of the relevant categories of the clustering structure. This output can be e.g. provided to a user through user interface 230.

According to some embodiments, the method can comprise creating (operation 1409) a new node in level $L_i$ and associating data $D_{signal}$ or $D_{raw}$ with this new node. This new node is linked to parent node $N_{p,L_{i-1}}$.

According to some embodiments, a centroid can be calculated for this new node based on $D_{signal}$. Embodiments for calculating the centroid of a node have been provided above.

In addition, an acceptance threshold can be assigned to this new node. This acceptance threshold can be set by a user, or can be predefined for all nodes of this level. In some embodiments, it can be set equal to the acceptance threshold of the parent node $N_{p,L_{i-1}}$.

In some embodiments, an output can be provided (e.g. to the user) indicating that $D_{signal}$ or $D_{raw}$ belongs to a category represented by a new node.

The method described in FIG. 14 can be stopped at some stage.

According to some embodiments, when $i=i_{max}$, the method can be stopped (reference 1406).

According to some embodiments, $i_{max}$ is reached when an end node of the clustering structure has been reached. In other words, this means that node $N_{p,L_{i\,max}}$ is not linked to any nodes of another level $L_i$, with $i'>i_{max}$.

According to some embodiments, $i_{max}$ is reached when the comparison of operation 1404 meets an acceptance threshold $T_{N_j,L_{i\,max}}$ of node $N_{p,L_{i\,max}}$ for which $T_{N_j,L_{i\,max}}$ is above a predefined confidence value. The predefined confidence value can be set by a user or predefined in a memory 220. In other words, this can indicate that the category that this node represents sufficiently matches the data, and therefore the method can be stopped.

Figure 15:
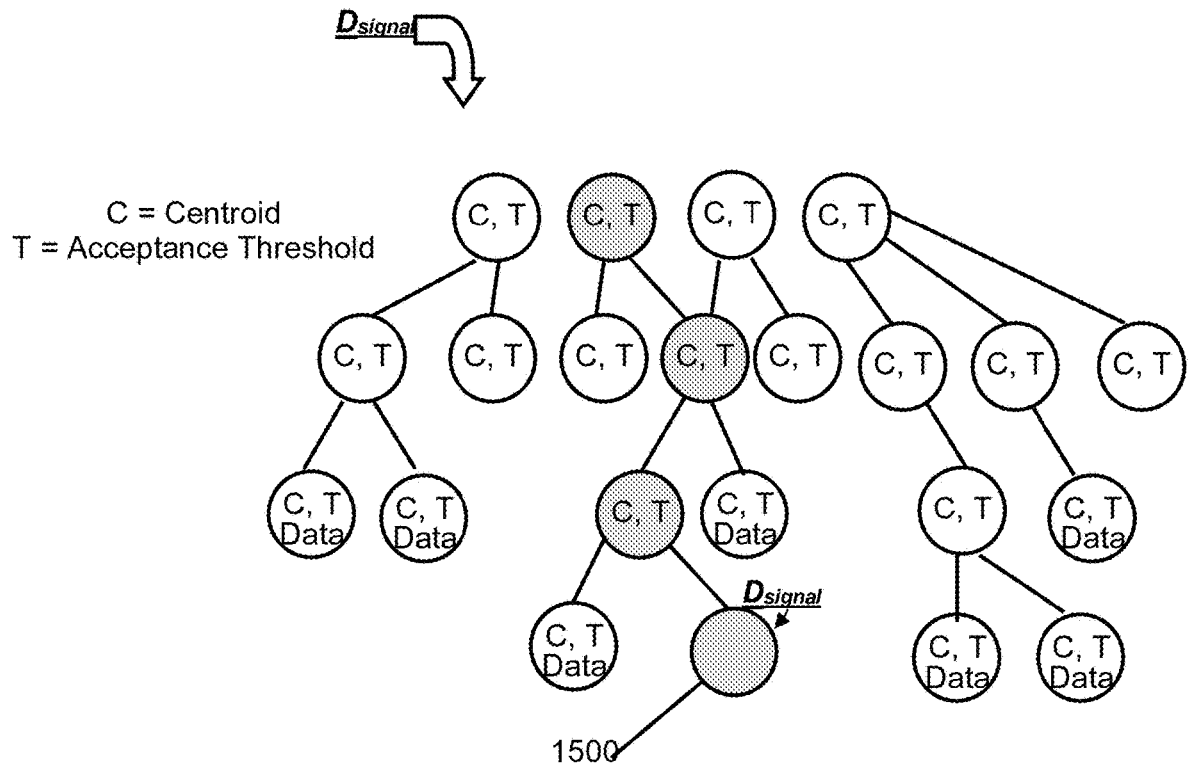
FIGS. 15 to 17 illustrate, in a graphic way, possible outcomes of the method of FIG. 14.
Figure 16:
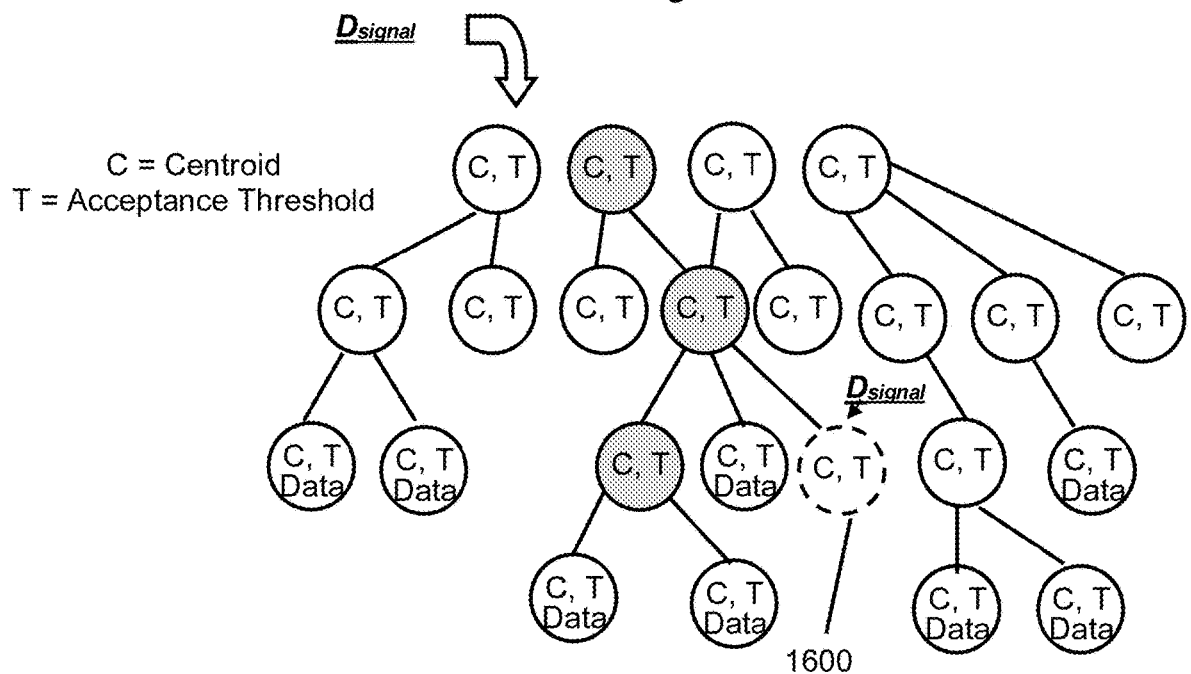
Figure 17:
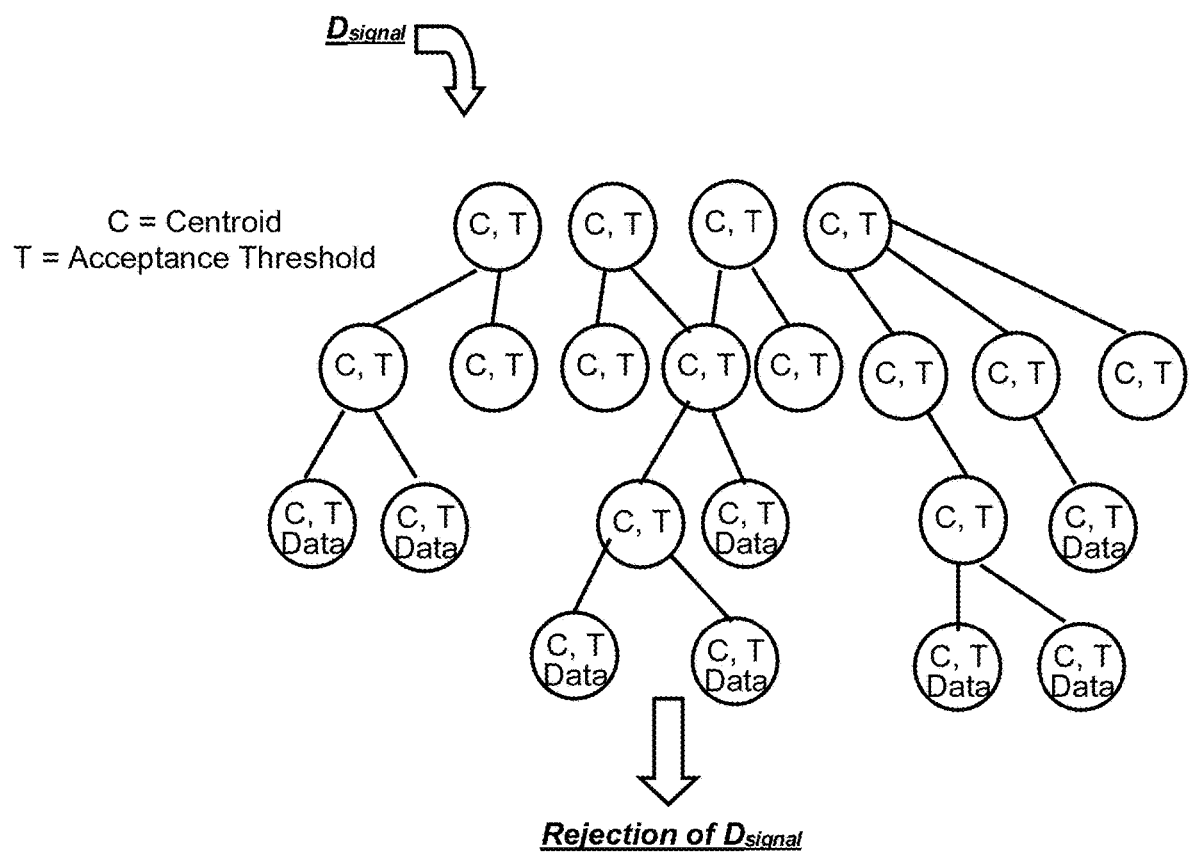

FIGS. 15 to 17 illustrate in a graphic way, possible outcomes of the method of FIG. 14.

In FIG. 15, it has been identified that data $D_{signal}$ belongs to a category represented by end node 1500 of the fourth level of the clustering structure (intermediate parent nodes of previous levels are also illustrated in grey).

In FIG. 16, it has been identified that data $D_{signal}$ belongs to a category represented by a new end node 1600 of the third level of the clustering structure (intermediate parent nodes of previous levels are also illustrated in grey). Corresponding centroid has been determined based on $D_{signal}$. An acceptance threshold has been assigned to this new node.

In FIG. 17, it has been identified that data $D_{signal}$ does not belong to any category of the clustering structure. A corresponding output ("rejection of $D_{signal}$") is provided to the user.

Once a relevant node (assume the relevant node is $N_{p,L_{j\,max}}$) has been identified for data $D_{raw}$ or for $D_{signal}$, various operations can be performed.

Various methods for clustering data $D_{signal}$ based on the clustering structure, have been described.

If a plurality of data $D_{signal}$ is obtained (e.g. $D_{signal,1}, \ldots D_{signal,Z'}$) and need to be clustered, according to some embodiments, each data can be processed individually according to the various methods described above (see FIGS. 14 to 17). For example, $D_{signal,1}$ can be processed and a category (or a rejection) can be output. Then, $D_{signal,2}$ can be processed and a category (or a rejection) can be output. As already mentioned, during the clustering of each data, this data can influence parameters of the clustering structure, such as centroid of nodes, threshold of nodes, etc. Therefore, the clustering structure is scalable and can be updated each time a request for clustering new data is performed.

According to other embodiments, if a plurality of data $D_{signal}$ is obtained (e.g. $D_{signal,1}, \ldots D_{signal,Z'}$), this data can be processed similarly to what was performed for building the clustering structure. In other words, instead of processing each data individually until it reaches an end node of the clustering structure, the data set can be processed together at each level, similarly to the building process described in FIGS. 3 to 13.

This method can comprise, for each data of data set ($D_{signal,1}, \ldots D_{signal,Z'}$):

for level $L_1$, performing operations 405, 410, 420, 430 (association to existing node) and/or 440 (creation of new node), as explained with reference to FIG. 4.

for level $L_1$, if necessary, at least one verification method can be performed, as explained with reference to FIG. 6.

During these operations, centroid and threshold of the nodes can be updated as already explained in the various embodiments above.

Once each data has been associated to nodes of the first level, the method can then attempt to identify nodes of the subsequent levels which match each data. This can comprise, for each data of data set ($D_{signal,1}, \ldots D_{signal,Z'}$), and for each level $L_i$, with i>1:

for level $L_i$, performing operations 1000, 1005, 1010, 1020, 1030 (association to existing node) and/or 1040 (creation of new node), as explained with reference to FIG. 10;

for level $L_i$, if necessary, at least one verification method can be performed, as explained with reference to FIG. 12.

During these operations, centroid and threshold of the nodes can be updated as already explained in the various embodiments above.

When a data reaches an end node, the method can be stopped for this data, since this indicates that the relevant category has been obtained. Other criteria can be used to assess when the method can be stopped, as already explained in the various embodiments above.

It thus appears that this method combines clustering of data and training/update of the clustering structure using a plurality of (new) data.

Assume now that the clustering structure was built using a data set $D_{old}$. Assume now that a new data set $D_{new}$ is received. If necessary, the same method can be used by processing an aggregated data set comprising $D_{old}$ and $D_{new}$. In other words, it is attempted to re-cluster even the old data, together with the new data.

Generally, the clustering structure is stable enough, since it was trained using a large data set relatively to the new data set, and therefore it is sufficient to cluster only each new data individually. This is however not limitative.

The clustering method described can be used for various applications. In some embodiments, it is attempted to cluster files (e.g. text files, executable files, presentations, etc.). Assume a clustering structure was built using a large data set obtained from a scan of one or more servers of a firm. Then, periodically, the method can comprise scanning the server to get new files. If data $D_{signal}$ which is obtained was already clustered in the past (this can be detected by comparing the obtained data with the data already associated with the end nodes of the clustering structure), then a corresponding output can be produced, indicating that the category of this data is known.

If data $D_{signal}$ which is obtained is unknown to the clustering structure, then the clustering method can be applied, and a corresponding output (e.g. category, or rejection) can be produced. This periodic scan of the content of the servers of the firm can be performed e.g. every day, or every week, but this is not limitative.

Figure 18:
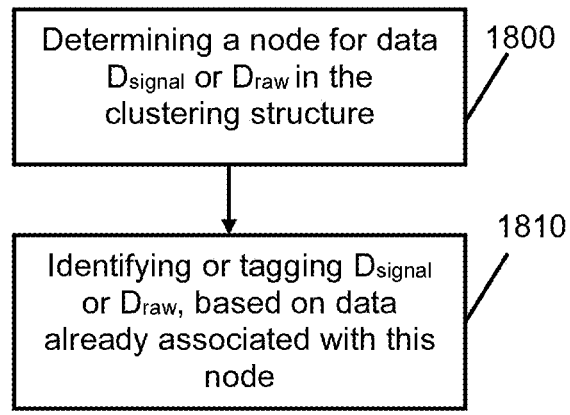
FIG. 18 depicts a method of identifying or tagging files using the clustering method.

Attention is drawn to FIG. 18.

According to some embodiments, the method can comprise identifying or tagging data $D_{signal}$ or $D_{raw}/D_{file}$ (see operations 1800-1810). In particular, this can be performed based on data belonging to a category represented by node $N_{p,L_{i\ max}}$. Generally (although this is not mandatory) $N_{p,L_{i\ max}}$ corresponds to an end node of the clustering tree, since the end nodes define the most precise categories.

Indeed, a memory (e.g. memory 220) can store, for node $N_{p,L_{i\ max}}$, data which is associated with this node. This association comes e.g. from the building of the clustering structure, and possibly from subsequent update of this clustering structure. Indeed, as explained above, when the clustering structure is built, a data set is used and it is attempted to build a plurality of nodes organized in hierarchical levels. Each data of the data set is associated with one or more nodes, defining the "path" of this data in the clustering tree. The association of each data with each node, or in some cases only with the end nodes, can be stored in a memory, and can be used e.g. in the present embodiment.

Assume this data has some characteristics CT. Since $D_{signal}$ or $D_{raw}/D_{file}$ has been identified as belonging to $N_{p,L_{i\ max}}$, it can be assumed that $D_{signal}$ or $D_{raw}/D_{file}$ share the same characteristics CT. Based on these characteristics, $D_{signal}$ or $D_{raw}/D_{file}$ can be thus identified. A corresponding output can be provided to the user.

Assume for example that node $N_{p,L_{i\ max}}$ is associated with a plurality of files (this association can be performed during the building of the clustering structure), wherein at least one file (or more) is tagged as being a secret document of the firm. It can be deduced that $D_{signal}$ or $D_{raw}/D_{file}$ also corresponds to a secret document, and therefore, $D_{signal}$ or $D_{raw}/D_{file}$ can also be tagged accordingly.

In some embodiments, if at least some of these files have a certain common tag (e.g. a tag which represents an invoice, salaries of employees, budget of the firm, internal report, specific policies associated with this file, such as list of persons who should receive this file, etc.—this list is not limitative), then the method can comprise tagging $D_{signal}$ or $D_{raw}/D_{file}$ with the same tag. Therefore, a powerful tool is provided to automatically tag $D_{signal}$ or $D_{raw}/D_{file}$.

Figure 18A:
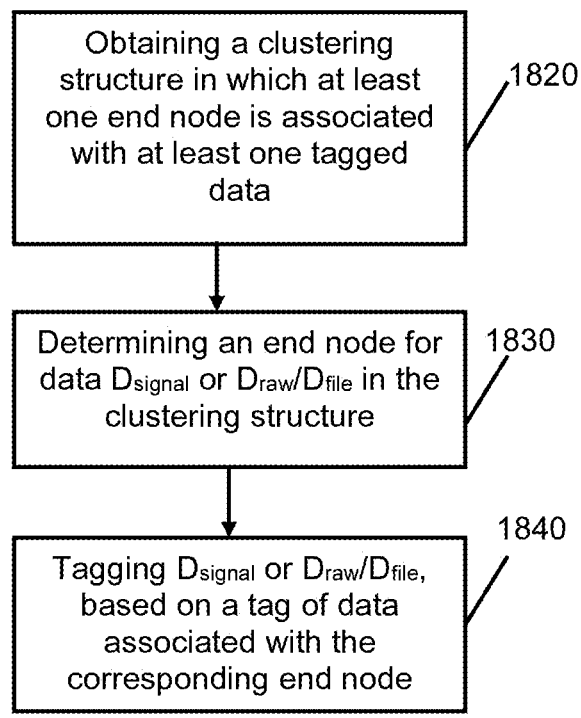
FIG. 18A depicts operations which can be performed for automatically tagging a file.

Operations which can be performed for automatically tagging data (such as a file) are described in FIG. 18A.

This can comprise obtaining (operation 1820) a clustering structure in which each end node (nodes are not linked with "children" nodes in the subsequent levels) of the clustering structure is associated with one or more data. Assume that for each end node, at least one of this data is associated with at least one tag.

When a new data is received and has to be clustered, it is attempted to identify an end node of the clustering structure (operation 1830) which best matches this new data (various methods have been described above for clustering new data based on the clustering structure).

Assume end node N has been identified, which is associated with one or more data $D_{old}$. Assume that at least one data $D_{old}$ is tagged with tag T.

The new data can be tagged (operation 1840) with the same at least one tag T.

Each time a new data is received and associated with an end node, a corresponding tag of data associated with this end node can be determined and can be used to automatically tag this new data.

In some cases, after building of the clustering structure, each end node can be associated with one or more tags (based on tagged data that was clustered in this end node during building of the clustering structure and/or during update of the clustering structure). Then, each time new data is associated with this end node, it can be automatically tagged accordingly.

Figure 19:
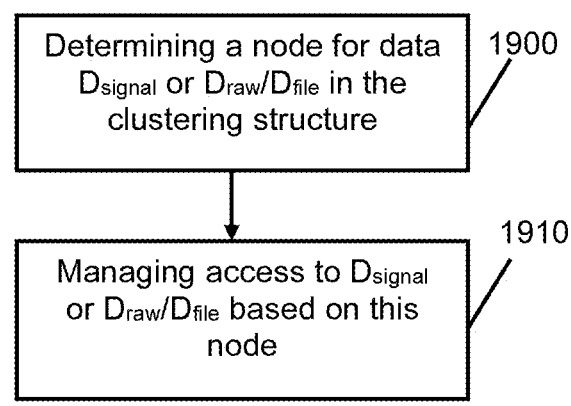
FIG. 19 depicts a method of managing an access to a file based on the category or node identified for this file.

Attention is drawn to FIG. 19.

According to some embodiments, the method can comprise managing an access to $D_{signal}$ and/or $D_{raw}$ based on the category or node identified for $D_{signal}/D_{raw}$.

In particular, this can comprise e.g. providing an access to $D_{signal}$ and/or $D_{raw}$ which is limited depending on a profile of a user.

An example can be that $D_{raw}$ is a file. Files identified as salaries of employees can be opened only by the management of the firm and by the employee himself. Files identified as secret documents can be opened only by users with the relevant authorization. Files identified as general documents of the firm can be opened by any employee of the company but not by persons who are external to the company. This example is not limitative.

Another application of the clustering method can be an identification of similar release of a file. Generally, in a company, a given file is created and then updated during time. For example, a file is created as file $F_0$ at time $t_0$, then updated to file $F_1$ at time $T_1$, file $F_2$ at time $T_2$, etc.

The clustering structure can be trained to comprise end nodes which reflect files which correspond to different releases of the same original file.

For example, the clustering structure can be built based on file $F_0$ and therefore an end node corresponding to this file can be built.

Then, when the system receives files $F_1$ and $F_2$, it can detect that they belong to the same category as file $F_0$. The user can thus receive an output indicating that files $F_1$ and $F_2$ belong to the same category as file $F_0$, and therefore, are different releases of the same file.

Figure 19A:
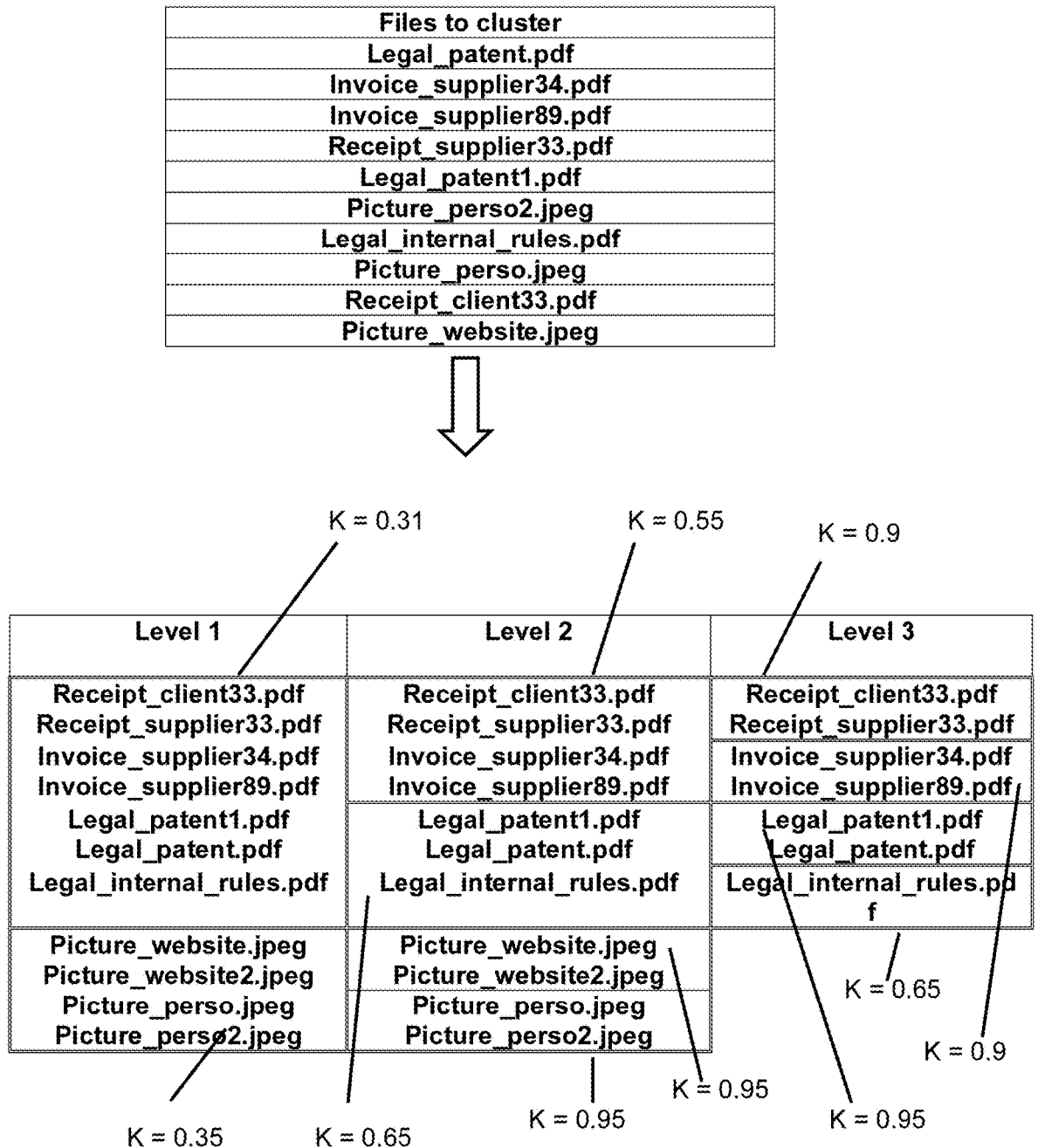
FIG. 19A depicts building a clustering structure based on a data set comprising various different files.

Attention is drawn to FIG. 19A, which depicts building of a clustering tree based on a data set comprising various different files. Acceptance thresholds are dictated/updated based on the data as explained e.g. in FIG. 8.

As shown, the first level comprises two nodes. The acceptance threshold of the first node is equal to 0.31 and the acceptance threshold of the second node is equal to 0.35.

The second level comprises four nodes. The acceptance threshold of the first node (linked to the first node of the first level) is equal to 0.55, the acceptance threshold of the second node (linked to the first node of the first level) is equal to 0.65, the acceptance threshold of the third node (linked to the second node of the first level) is equal to 0.95 and the acceptance threshold of the fourth node (linked to the second node of the first level) is equal to 0.95.

The third level comprises four nodes. The acceptance threshold of the first node (linked to the first node of the second level) is equal to 0.9, the acceptance threshold of the second node (linked to the first node of the second level) is equal to 0.9, the acceptance threshold of the third node (linked to the second node of the second level) is equal to 0.99 and the acceptance threshold of the fourth node (linked to the second node of the second level) is equal to 0.65 (this is due to the fact that the acceptance threshold of this node was set equal to its parent node, and since only one file was associated with this node, this acceptance threshold was not updated).

One can see that the higher the level in the clustering structure, the higher the acceptance threshold (since finer clustering is obtained).

If, for example, in the second node of third level, one of the files is tagged as an invoice of suppliers, it can be deduced that all files of these nodes are invoices of suppliers, and can be tagged or handled or categorized accordingly. This is however not limitative.

Figure 20:
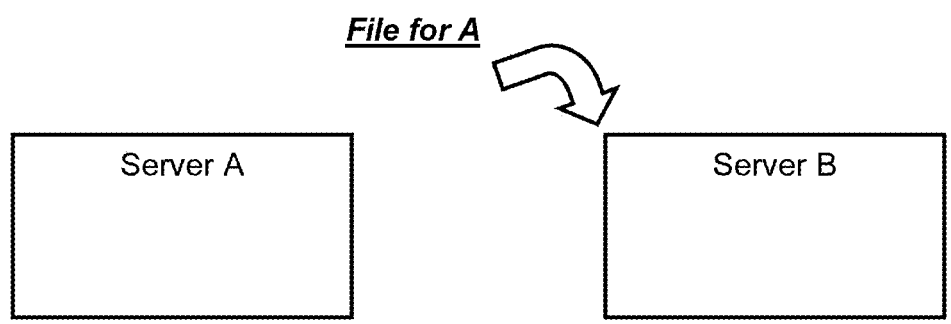
FIG. 20 depicts a method of managing access to files between two entities/servers based on the clustering method.

Attention is now drawn to FIG. 20, which depicts another possible application of the methods and systems described above.

Assume that a first clustering structure was built for files of server A, and that a second clustering structure was built for files of server B. Assume that for security reasons, files of server A should be separated from files of server B. In other words, files of server A should be not accessed by server B (and in some embodiments conversely).

Assume a new file is received by server B, which is in fact a file which is authorized only to server A. The clustering method applied at server B will indicate that this file belongs to a category which is unknown to server B, and therefore, should be rejected.

It is to be noted that the various features described in the various embodiments may be combined according to all possible technical combinations.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

Those skilled in the art will readily appreciate that various modifications and changes can be applied to the embodiments of the invention as hereinbefore described without departing from its scope, defined in and by the appended claims.

The invention claimed is:

1. A method of clustering files, comprising, by a processing unit:
   obtaining a clustering structure comprising a plurality of nodes arranged in hierarchical levels $L_i$, with i from 1 to N,
   wherein each node is representative of a category of files, wherein said category is representative of files sharing similarities,
   wherein each node of level $L_i$ is linked to a parent node of level $L_{i-1}$, with i from 2 to N, thereby indicating that each data belonging to a category represented by said node also belongs to a category represented by said parent node,
   wherein each node is associated with at least one acceptance threshold,
   wherein each node associated with at least one centroid representative of files belonging to a category represented by said node,
   obtaining at least one data ($D_{signal}$) representative of a file ($D_{file}$) to be assigned to a category;
   ($O_1$) comparing said data to each centroid of each node of the first level,
   ($O_2$) when said comparison matches the acceptance threshold of one or more nodes, selecting a node among these nodes, and when said comparison does not meet an acceptance threshold of any node, creating a new node in the first level, wherein a centroid of said new node is determined based at least on $D_{signal}$;

($O_3$) comparing $D_{signal}$ to each centroid of each node of a next level which is linked to said selected node, ($O_4$) when said comparison matches the acceptance threshold of one or more nodes, selecting a node among these nodes, and when said comparison does not meet an acceptance threshold of any node, creating a new node, wherein, for a level $L_i$ with i>1, said new node is linked to said selected node, wherein a centroid of said new node is determined based at least on $D_{signal}$;

repeating $O_3$ and $O_4$ until a stopping condition is met, thereby indicating that said data $D_{signal}$ or said file $D_{file}$ belongs to a category of files represented by said selected node, wherein a centroid and an acceptance threshold of said selected node are updated based on said data $D_{signal}$.

2. The method of claim 1, wherein at least one of operations $O_2$ and $O_4$ further comprises:
for data for which said comparison does not meet an acceptance threshold of any nodes, performing at least one of (a), (b), (c) and (d):
 a) providing an output that $D_{signal}$ or $D_{file}$ does not belong to any category of the clustering structure,
 b) providing an output that $D_{signal}$ or $D_{file}$ does not belong to any category of level $L_i$ of the clustering structure,
 c) providing an output that $D_{signal}$ or $D_{file}$ does not belong to any sub-category of a category represented by said selected node,
 d) triggering an action representative of a reject of data $D_{signal}$ or $D_{file}$.

3. The method of claim 1, comprising at least one of:
said stopping condition is met when said selected node is not a parent node of any node in a next level;
said stopping condition is met when said comparison meets an acceptance threshold of said selected node, wherein said acceptance threshold is above a predefined confidence value.

4. The method of claim 1, comprising at least one of:
providing an access to $D_{signal}$ or $D_{file}$ which is limited depending at least on a category determined for $D_{signal}$ or $D_{file}$, and
identifying or tagging $D_{signal}$ or $D_{file}$ based on characteristics of one or more files previously identified as being associated with said selected node.

5. The method of claim 1, wherein for each selected node at operations $O_2$ and $O_4$, the method comprises updating a centroid of said node from a first value to a second value, based at least on $D_{signal}$ and on said first value but without requiring accessing to data representative of files previously associated with said selected node.

6. A method of clustering files, comprising, by a processing unit:
obtaining a plurality of data ($D_{signal, 1}, \ldots, D_{signal, z}$) representative of a plurality of files ($D_{file, 1}, \ldots, D_{file, z}$) to be clustered,
building a clustering structure comprising a plurality of nodes arranged in hierarchical levels $L_i$, with i from 1 to N, wherein each node is representative of a category of files, wherein said category is representative of files sharing similarities,
wherein said building comprises, based on said plurality of data ($D_{signal, 1}, \ldots, D_{signal, z}$):

wherein the method comprises, for data which does not meet an acceptance threshold of any node of the level $L_i$, creating a new node in the level $L_i$, wherein a centroid of said new node is determined based at least on said data, wherein, during said building, at least part of said plurality of data ($D_{signal, 1}, \ldots, D_{signal, z}$) or of said plurality of files ($D_{file, 1}, \ldots, D_{file, z}$) is each associated with one or more of the nodes of the clustering structure, thereby reflecting that said node is representative of a category of files and facilitating future identification of a category of a file based on said clustering structure.

7. The method of claim 6, wherein, after building of the clustering structure, for each node of level $L_i$, or of at least some nodes of level $L_i$, an acceptance threshold of said each node is stricter than an acceptance threshold of a parent node of said each node, wherein the parent node is a node of level $L_{i-1}$, for at least some values of i between 2 and N, or for all values of i between 2 and N.

8. The method of claim 6, wherein said building comprises:
for i=1, comparing each of one or more data ($D_{signal, 1}, \ldots, D_{signal, z}$) to each centroid of each node in level $L_1$,
obtaining one or mode nodes of level $L_1$, wherein each node is associated with an acceptance threshold and a centroid representative of files belonging to a category represented by said node,
performing repetitively, for i=2 to N:
 building one or more nodes of level $L_i$, wherein each node of level $L_i$, is linked to a parent node of level $L_{i-1}$, with i from 2 to N, thereby indicating that each file belonging to a category represented by said node also belongs to a category represented by said parent node,
 wherein each node is associated with at least one acceptance threshold and at least one centroid representative of files belonging to a category represented by said node,
wherein, for each node, said acceptance threshold and said centroid are usable for defining which file belongs to category represented by said node,
wherein a value of an acceptance threshold of a node is dynamically updated based on data which is associated with said node during building of the clustering structure, thereby allowing said data to influence said acceptance threshold,
for i>1, for a parent node of level $L_{i-1}$ with which a subset of data ($D_{signal, 1}, \ldots, D_{signal, z}$) is associated, comparing each data of said subset to each centroid of each node of level $L_i$ which is linked to said parent node,
for said data,
 when said comparison meets an acceptance threshold of one or more nodes, associating said data with one of said nodes,
 when said comparison does not meet an acceptance threshold of any node, creating a new node in level $L_i$, wherein, for i>1, said new node is linked to said parent node of level $L_{i-1}$.

9. The method of claim 6, comprising at least one of (A) and (B):
(A) after building nodes of level $L_1$, wherein after said building each node is associated with a centroid having a first value and reflecting data associated with said node, performing at least once a verification comprising:

attempting to associate each data of said plurality of data ($D_{signal, 1}, \ldots, D_{signal, z}$) with a node of level $L_1$, by determining whether a comparison of said data with a centroid of said node matches an acceptance threshold of said node, and updating said first value of said centroid of each of one or more nodes based on data associated with said node, (B) after building nodes of level $L_i$, linked with a parent node of level $L_i$ for at least one value of i>1, wherein after said building each node is associated with a centroid having a first value and reflecting data associated with said node, performing at least once a verification comprising:

attempting to associate each data associated with said parent node of level $L_i$ with a node of level $L_i$ linked with said parent node, by determining whether a comparison of said data with a centroid of said node matches an acceptance threshold of said node, and updating said first value of said centroid of each of one or more nodes based on data associated with said node.

10. A system for clustering files, comprising, by a processing unit:

obtain a clustering structure comprising a plurality of nodes arranged in hierarchical levels $L_i$, with i from 1 to N, wherein each node is representative of a category of files, wherein said category is representative of files sharing similarities, wherein each node of level $L_i$ is linked to a parent node of level $L_{i-1}$, with i from 2 to N, thereby indicating that each data belonging to a category represented by said node also belongs to a category represented by said parent node, wherein each node is associated with at least one acceptance threshold, wherein each node is associated with at least one centroid representative of files belonging to a category represented by said node, obtain at least one data ($D_{signal}$) representative of a file ($D_{file}$) to be assigned to a category;

($O_1$) compare said data to each centroid of each node of the first level, ($O_2$) when said comparison matches the acceptance threshold of one or more nodes, select a node among these nodes, and when said comparison does not meet an acceptance threshold of any node, create a new node in the first level, wherein a centroid of said new node is determined based at least on $D_{signal}$;

($O_3$) compare $D_{signal}$ to each centroid of each node of a next level which is linked to said selected node, ($O_4$) when said comparison matches the acceptance threshold of one or more nodes, select a node among these nodes, and when said comparison does not meet an acceptance threshold of any node, create a new node, wherein, for a level $L_i$ with i>1, said new node is linked to said selected node, wherein a centroid of said new node is determined based at least on $D_{signal}$;

repeat $O_3$ and $O_4$ until a stopping condition is met, thereby indicating that said data $D_{signal}$ or said file $D_{file}$ belongs to a category of files represented by said selected node wherein a centroid and an acceptance threshold of said selected node are updated based on said data $D_{signal}$.

11. The system of claim 10, wherein at least one of operations $O_2$ and $O_4$ further comprises:

for data for which said comparison does not meet an acceptance threshold of any nodes perform at least one of (a), (b), (c), (d) and (e):

a) provide an output that $D_{signal}$ or $D_{file}$ does not belong to any category of the clustering structure, b) provide an output that $D_{signal}$ or $D_{file}$ does not belong to any category of level $L_i$ of the clustering structure, c) provide an output that $D_{signal}$ or $D_{file}$ does not belong to any sub-category of a category represented by said selected node, d) trigger an action representative of a reject of data $D_{signal}$ or $D_{file}$, e) create a new node, wherein, for a level $L_i$ with i>1, said new node is linked to said selected node, wherein a centroid of said new node is determined based at least on $D_{signal}$.

12. The system of claim 10, wherein:

said stopping condition is met when said selected node is not a parent node of any node in a next level; or said stopping condition is met when said comparison meets an acceptance threshold of said selected node, wherein said acceptance threshold is above a predefined confidence value.

13. The system of claim 10, configured to perform at least one of:

providing an access to $D_{signal}$ or $D_{file}$ which is limited depending at least on a category determined for $D_{signal}$ or $D_{file}$, and identifying or tagging $D_{signal}$ or $D_{file}$ based on characteristics of one or more files previously identified as being associated with said selected node.

14. The system of claim 10, wherein for each selected node at operations $O_2$ and $O_4$, the system is configured to update a centroid of said node from a first value to a second value based at least on $D_{signal}$ and on said first value but without requiring accessing to data representative of files previously associated with said selected node.

15. A system for clustering files, comprising, by a processing unit:

obtain a plurality of data ($D_{signal, 1}, \ldots, D_{signal, z}$) representative of a plurality of files ($D_{file, 1}, \ldots, D_{file, z}$) to be clustered, build a clustering structure comprising a plurality of nodes arranged in hierarchical levels $L_i$, with i from 1 to N, wherein each node is representative of a category of files, wherein said category is representative of files sharing similarities, wherein said building comprises, based on said plurality of data ($D_{signal, 1}, \ldots, D_{signal, z}$):

obtaining one or mode nodes of level $L_i$, wherein each node is associated with an acceptance threshold and a centroid representative of files belonging to a category represented by said node, performing repetitively, for i=2 to N:

building one or more nodes of level $L_i$, wherein each node of level $L_i$ is linked to a parent node of level $L_{i-1}$, with i from 2 to N, thereby indicating that each file belonging to a category represented by said node also belongs to a category represented by said parent node, wherein each node is associated with at least one acceptance threshold and at least one centroid representative of files belonging to a category represented by said node, wherein, for each node, said acceptance threshold and said centroid are usable for defining which file belongs to the category represented by said node, wherein a value of an acceptance threshold of a node is dynamically updated based on data which is associated with said node during building of the clustering structure, thereby allowing said data to influence said acceptance threshold, wherein the system is configured to, for data which does not meet an acceptance threshold of any node of the level $L_i$, create a new node in the level $L_i$, wherein a centroid of said new node is determined based at least on said data, wherein, during said building, at least part of said plurality of data ($D_{signal,\ 1}, \ldots, D_{signal,\ Z}$), or of said plurality of files ($D_{file,\ 1}, \ldots, D_{file,\ Z}$) is each associated with one or more of the nodes of the clustering structure, thereby reflecting that said node is representative of a category of files and facilitating future identification of a category of a file based on said clustering structure.

16. The system of claim 15, configured to perform:

for i=1, comparing each of one or more data ($D_{signal,\ 1}, \ldots, D_{signal,\ Z}$) to each centroid of each node in level $L_1$, for i>1, for a parent node of level $L_{i-1}$ with which a subset of data ($D_{signal,\ 1}, \ldots, D_{signal,\ Z}$) is associated, comparing each data of said subset to each centroid of each node of level $L_i$ which is linked to said parent node, for said data,
  when said comparison meets an acceptance threshold of one or more nodes, associating said data with one of said nodes,
  when said comparison does not meet an acceptance threshold of any node, creating a new node in level $L_i$, wherein, for i>1, said new node is linked to said parent node of level $L_{i-1}$.

17. The system of claim 15, configured to perform at least one of (A) and (B):

(A) after building nodes of level $L_1$, wherein after said building each node is associated with a centroid having a first value and reflecting data associated with said node, performing at least once a verification comprising:
  attempting to associate each data of said plurality of data ($D_{signal,\ 1}, \ldots D_{signal,\ Z}$) with a node of level $L_i$, by determining whether a comparison of said data with a centroid of said matches an acceptance threshold of said node, and updating said first value of said centroid of each of one or more nodes based on data associated with said node, (B) after building nodes of level $L_i$ linked with a parent node of level $L_i$ for at least one value of i>1, wherein after said building each node is associated with a centroid having a first value and reflecting data associated with said node, performing at least once a verification comprising:
  attempting to associate each data associated with said parent node of level $L_i$ with a node of level $L_i$ linked with said parent node, by determining whether a comparison of said data with a centroid of said node matches an acceptance threshold of said node, and updating said first value of said centroid of each of one or more nodes based on data associated with said node.

18. A non-transitory storage device readable by a machine, tangibly embodying a program of instructions executable by the machine to perform a method of clustering files comprising:

obtaining a clustering structure comprising a plurality of nodes arranged in hierarchical levels $L_i$, with i from 1 to N, wherein each node is representative of a category of files, wherein said category is representative of files sharing similarities, wherein each node of level $L_i$ is linked to a parent node of level $L_{i-1}$, with i from 2 to N, thereby indicating that each data belonging to a category represented by said node also belongs to a category represented by said parent node, wherein each node is associated with at least one acceptance threshold, wherein each node associated with at least one centroid representative of files belonging to a category represented by said node, obtaining at least one data ($D_{signal}$) representative of a file ($D_{file}$) to be assigned to a category;

($O_1$) comparing said data to each centroid of each node of the first level, ($O_2$) when said comparison matches the acceptance threshold of one or more nodes, selecting a node among these nodes, and when said comparison does not meet an acceptance threshold of any node, creating a new node in the first level, wherein a centroid of said new node is determined based at least on $D_{signal}$;

($O_3$) comparing $D_{signal}$ to each centroid of each node of a next level which is linked to said selected node, ($O_4$) when said comparison matches the acceptance threshold of one or more nodes, selecting a node among these nodes, and when said comparison does not meet an acceptance threshold of any node, creating a new node, wherein, for a level $L_i$ with i>1, said new node is linked to said selected node, wherein a centroid of said new node is determined based at least on $D_{signal}$ repeating $O_3$ and $O_4$ until a stopping condition is met, thereby indicating that said data $D_{signal}$ or said file $D_{file}$ belongs to a category of files represented by said selected node, wherein a centroid and an acceptance threshold of said selected node are updated based on said data $D_{signal}$.

19. A non-transitory storage device readable by a machine, tangibly embodying a program of instructions executable by the machine to perform a method of clustering files comprising:

obtaining a plurality of data ($D_{signal,\ 1}, \ldots, D_{signal,\ Z}$) representative of a plurality of files ($D_{file,\ 1}, \ldots, D_{file,\ Z}$) to be clustered, building a clustering structure comprising a plurality of nodes arranged in hierarchical levels $L_i$, with i from 1 to N, wherein each node is representative of a category of files, wherein said category is representative of files sharing similarities, wherein said building comprises, based on said plurality of data ($D_{signal,\ 1}, \ldots, D_{signal,\ Z}$):

obtaining one or mode nodes of level $L_1$, wherein each node is associated with an acceptance threshold and a centroid representative of files belonging to a category represented by said node, performing repetitively, for i=2 to N:
  building one or more nodes of level $L_i$, wherein each node of level $L_i$ is linked to a parent node of level $L_{i-1}$, with i from 2 to N, thereby indicating that each file belonging to a category represented by said node also belongs to a category represented by said parent node, wherein each node is associated with at least one acceptance threshold and at least one centroid representative of files belonging to a category represented by said node, wherein, for each node, said acceptance threshold and said centroid are usable for defining which file belongs to category represented by said node, wherein a value of an acceptance threshold of a node is dynamically updated based on data which is associated with said node during building of the clustering structure, thereby allowing said data to influence said acceptance threshold, wherein the method comprises, for data which does not meet an acceptance threshold of any node of the level $L_i$, creating a new node in the level $L_i$, wherein a centroid of said new node is determined based at least on said data, wherein, during said building, at least part of said plurality of data ($D_{signal, 1}, \ldots, D_{signal, z}$) or of said plurality of files ($D_{file, 1}, \ldots, D_{file, z}$) is each associated with one or more of the nodes of the clustering structure, thereby reflecting that said node is representative of a category of files and facilitating future identification of a category of a file based on said clustering structure.

* * * * *

UNITED STATES PATENT AND TRADEMARK OFFICE
CERTIFICATE OF CORRECTION

Page 1 of 2

PATENT NO. : 10,922,271 B2
APPLICATION NO. : 16/154630
DATED : February 16, 2021
INVENTOR(S) : Avner Atias et al.

It is certified that error appears in the above-identified patent and that said Letters Patent is hereby corrected as shown below:

In the Claims

At Claim 6, Column 31, Line 56 through Column 32, Line 12, delete:
"6. A method of clustering files, comprising, by a processing unit:
  obtaining a plurality of data ($D_{signal, 1}, \ldots, D_{signal, z}$)
    representative of a plurality of files ($D_{file, 1}, \ldots,$
    $D_{file, z}$) to be clustered,
  building a clustering structure comprising a plurality of
    nodes arranged in hierarchical levels $L_i$, with i from 1
    to N, wherein each node is representative of a category
    of files, wherein said category is representative of files
    sharing similarities,
  wherein said building comprises, based on said plurality
    of data ($D_{signal, 1}, \ldots, D_{signal, z}$):
  wherein the method comprises, for data which does not
    meet an acceptance threshold of any node of the level
    $L_i$, creating a new node in the level $L_i$, wherein a
    centroid of said new node is determined based at least
    on said data,
  wherein, during said building, at least part of said plurality of data ($D_{signal, 1}, \ldots, D_{signal, z}$) or of said plurality
    of files ($D_{file, 1}, \ldots, D_{file, z}$) is each associated with one
    or more of the nodes of the clustering structure, thereby
    reflecting that said node is representative of a category
    of files and facilitating future identification of a category of a file based on said clustering structure."

Insert:
--6. A method of clustering files, comprising, by a processing unit:

Signed and Sealed this
First Day of June, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,922,271 B2

- obtaining a plurality of data ($D_{signal, 1}$, ..., $D_{signal, z}$) representative of a plurality of files ($D_{file, 1}$, ..., $D_{file, z}$) to be clustered,
- building a clustering structure comprising a plurality of nodes arranged in hierarchical levels $L_i$, with i from 1 to N, wherein each node is representative of a category of files, wherein said category is representative of files sharing similarities,
- wherein said building comprises, based on said plurality of data ($D_{signal, 1}$, ..., $D_{signal, z}$):
    - obtaining one or mode nodes of level $L_1$, wherein each node is associated with an acceptance threshold and a centroid representative of files belonging to a category represented by said node,
    - performing repetitively, for i =2 to N:
        - building one or more nodes of level $L_i$, wherein each node of level $L_i$ is linked to a parent node of level $L_{i-1}$, with i from 2 to N, thereby indicating that each file belonging to a category represented by said node also belongs to a category represented by said parent node, wherein each node is associated with at least one acceptance threshold and at least one centroid representative of files belonging to a category represented by said node, wherein, for each node, said acceptance threshold and said centroid are usable for defining which file belongs to category represented by said node, wherein a value of an acceptance threshold of a node is dynamically updated based on data which is associated with said node during building of the clustering structure, thereby allowing said data to influence said acceptance threshold, wherein the method comprises, for data which does not meet an acceptance threshold of any node of the level $L_i$, creating a new node in the level $L_i$, wherein a centroid of said new node is determined based at least on said data, wherein, during said building, at least part of said plurality of data ($D_{signal, 1}$, ..., $D_{signal, z}$) or of said plurality of files ($D_{file, 1}$, ..., $D_{file, z}$) is each associated with one or more of the nodes of the clustering structure, thereby reflecting that said node is representative of a category of files and facilitating future identification of a category of a file based on said clustering structure.--